(12) United States Patent
Bhattacharyya et al.

(10) Patent No.: US 8,660,984 B1
(45) Date of Patent: Feb. 25, 2014

(54) METHOD AND SYSTEM FOR AUTOMATIC CATEGORIZATION OF CHECK-BASED FINANCIAL TRANSACTIONS

(75) Inventors: Indraneel Bhattacharyya, Mountain View, CA (US); David Lish, Burlingame, CA (US); Christopher H. J. Whittam, Hillsborough, CA (US); Ryan Pfeffer, Menlo Park, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/350,517

(22) Filed: Jan. 13, 2012

(51) Int. Cl.
  *G06F 7/00* (2006.01)
  *G06F 17/00* (2006.01)

(52) U.S. Cl.
  USPC .......... 707/602; 707/603; 707/736; 707/737; 705/35; 705/42; 705/45; 235/379; 382/137; 382/139; 382/140

(58) Field of Classification Search
  USPC ........ 707/602, 603, 736, 737; 705/35, 42, 45; 235/379; 382/137, 139, 140
  See application file for complete search history.

(56) References Cited

U.S. PATENT DOCUMENTS

| | | | |
|---|---|---|---|
| 5,530,438 A | 6/1996 | Bickham et al. | |
| 5,559,313 A | 9/1996 | Claus et al. | |
| 5,737,440 A | 4/1998 | Kunkler | |
| 5,878,337 A | 3/1999 | Joao et al. | |
| 6,574,600 B1 * | 6/2003 | Fishman et al. | 704/270 |
| 6,908,031 B2 | 6/2005 | Seifert et al. | |
| 7,376,618 B1 | 5/2008 | Anderson et al. | |
| 7,970,701 B2 | 6/2011 | Lewis et al. | |
| 8,073,759 B1 | 12/2011 | Del Favero et al. | |
| 8,121,950 B2 * | 2/2012 | Hassanein et al. | 705/45 |
| 8,170,932 B1 * | 5/2012 | Krakowiecki et al. | 705/30 |
| 8,175,897 B2 | 5/2012 | Lee et al. | |
| 8,234,195 B1 | 7/2012 | Berhanu et al. | |
| 8,244,629 B2 | 8/2012 | Lewis et al. | |
| 8,254,535 B1 * | 8/2012 | Madhavapeddi et al. | 379/88.18 |
| 2002/0128917 A1 | 9/2002 | Grounds | |
| 2003/0061132 A1 | 3/2003 | Yu et al. | |
| 2004/0083134 A1 | 4/2004 | Spero et al. | |
| 2004/0111371 A1 * | 6/2004 | Friedman | 705/42 |
| 2006/0031123 A1 | 2/2006 | Leggett et al. | |

(Continued)

OTHER PUBLICATIONS

Whittam et al., "Method and System for Utilizing Location Data for Automatic Categorization of Financial Transactions," U.S. Appl. No. 13/149,776, filed May 31, 2011.

(Continued)

*Primary Examiner* — Hares Jami
(74) *Attorney, Agent, or Firm* — Hawley Troxell Ennis & Hawley LLP; Philip McKay; Sean P. Lewis

(57) ABSTRACT

An optical image of a check is obtained at the approximate time of a check-based financial transaction and the approximate time of the check-based financial transaction is recorded. Geographical position/location data and/or voice memo data is then obtained at, or about, the time the optical image of the check is obtained. Optical Character Recognition (OCR) technology is then used to extract image-based financial transaction data from the optical image of the check and the geographical position/location data, and/or voice memo data, is also transformed into financial transaction data associated with the check and the check-based financial transaction. The extracted and/or transformed financial transaction data is then used, at least in part, to automatically assign a financial category to the check-based financial transaction and/or transform the category status of the check-based financial transaction.

17 Claims, 3 Drawing Sheets

(56) References Cited

U.S. PATENT DOCUMENTS

| | | |
|---|---|---|
| 2006/0196930 A1 | 9/2006 | Hart et al. |
| 2008/0140505 A1 | 6/2008 | Romano et al. |
| 2008/0140576 A1 | 6/2008 | Lewis et al. |
| 2009/0030692 A1* | 1/2009 | Deligne et al. ............... 704/257 |
| 2009/0037461 A1 | 2/2009 | Rukonic et al. |
| 2009/0094182 A1 | 4/2009 | Najarian et al. |
| 2009/0222364 A1 | 9/2009 | McGlynn et al. |
| 2009/0300068 A1* | 12/2009 | Tang ............................ 707/104.1 |
| 2009/0307136 A1* | 12/2009 | Hawkins ........................ 705/45 |
| 2009/0321522 A1* | 12/2009 | Lohr et al. ............... 235/462.13 |
| 2009/0327134 A1 | 12/2009 | Carlson et al. |
| 2010/0138328 A1 | 6/2010 | Venturo et al. |
| 2010/0287099 A1 | 11/2010 | Liu et al. |
| 2011/0093324 A1 | 4/2011 | Fordyce et al. |
| 2011/0112869 A1 | 5/2011 | Greak |
| 2011/0264543 A1 | 10/2011 | Taveau et al. |
| 2011/0282778 A1 | 11/2011 | Wright et al. |
| 2011/0302011 A1 | 12/2011 | Yoder et al. |
| 2012/0047052 A1* | 2/2012 | Patel ............................... 705/30 |
| 2012/0130796 A1 | 5/2012 | Busch |
| 2013/0124263 A1 | 5/2013 | Amaro et al. |

OTHER PUBLICATIONS

Channakeshava, "Method and System for Improving Automatic Categorization of Financial Transactions," U.S. Appl. No. 13/193,445, filed Jul. 28, 2011.

Channakeshava, "Method and System for Automatically Obtaining and Categorizing Cash Transaction Data Using a Mobile Computing System," U.S. Appl. No. 13/272,946, filed Oct. 13, 2011.

Madhani, "Method and System for Semi-Automated Setup of Accounts within a Data Management System," U.S. Appl. No. 13/416,966, filed Mar. 9, 2012.

Madhani, "Method and System for Automated Classification and Categorization of Hardcopy Financial Transaction Records," U.S. Appl. No. 13/456,383, filed Apr. 26, 2012.

Rukonic et al., "Method and System for Identifying a Merchant Payee Associated with a Cash Transaction," U.S. Appl. No. 13/653,083, filed Oct. 16, 2012.

Channakeshava, "Method and System for Automatic Classification of Check and Cash Transactions by a Financial Management System," U.S. Appl. No. 13/752,041, filed Jan. 28, 2013.

* cited by examiner

METHOD AND SYSTEM FOR AUTOMATIC CATEGORIZATION OF CHECK-BASED FINANCIAL TRANSACTIONS

BACKGROUND

Currently, several financial management systems are available to help an individual user, or an authorized party acting on behalf of an individual user, obtain the user's financial data, process/analyze the user's financial data, and generate various reports for the user.

Financial management systems typically help users manage their finances by providing a centralized interface with banks, credit card companies, and other various financial institutions, for electronically identifying and categorizing user financial transactions based on electronic data representing the financial transactions. Currently, financial management systems typically obtain the electronic transaction based information, such as payee, payment amount, date, etc. via communication with banks, credit card providers, or other financial institutions, using electronic data transfer systems such as the Open Financial Exchange (OFX) specification, or various other systems for transferring financial transaction data.

Typically a financial management system's ability to identify and categorize specific financial transactions is what allows the financial management system to provide the features that are of interest to the user. Typically, the ability to categorize specific financial transactions is, in turn, dependent on an ability of the financial management system to obtain the electronic financial transaction data necessary to identify and categorize specific financial transactions.

For this reason, currently available methods and systems of automatic categorization of financial transactions based on payee name are only applicable to electronic transactions, or financial transactions that are represented by electronic financial transaction data. However, while many financial transactions involving individual consumers do generate electronic financial transaction data, many other financial transactions still rely on the use of paper checks. Currently, these check-based transactions are largely excluded from the automatic categorization process. Therefore, currently, the data related to a check-based financial transaction, such as payee, payment amount, date, etc., must be manually entered into financial management systems.

In addition, the payee associated with a given financial transaction is not always discernible from financial transaction data, and some payee names can be misleading so that a categorization of the check-based financial transaction cannot be accurately determined even after the financial transaction data has been obtained. For example, a payee name associated with a check-based financial transaction may be absent altogether, unreadable, coded, or represent the name of a parent company that indicates nothing about the actual merchant or products that are the subject of the financial transaction.

In addition, some payee names are misleading and can easily confuse an automatic, or even a manual, categorization system. For example, a fast food restaurant having a 50's drive through theme may be named "The Auto Shop" or "Pit Stop." In this case, a currently available automatic categorization system, or even a user manually entering the financial transaction data, is likely to categorize the financial transaction as an automotive expense based on the payee name, as opposed to the proper categorization as a food/dining expense.

Unfortunately, in most cases, the correction of an incorrect categorization of a given financial transaction takes more user time, and more user manual entry, to fix than it would have taken to manually enter the correct categorization of financial transaction in the first place.

As a result of the current situation, and limitations of current automatic categorization systems, check-based financial transactions are currently largely excluded from methods of automatic categorization of financial transactions, and/or any attempts to automatically categorize check-based financial transactions are often inaccurate and fail to correctly and reliably categorize the check-based financial transactions.

As a result, using current financial management systems, the user is often forced to perform significant manual data entry. This is particularly problematic given that experience has shown that an average user is far more likely to adopt, and continue to use, any financial management system if the amount of manual data entry, i.e., data entry made via any user interface device, such as a keyboard, a mouse, a touch pad, or any other device that requires input from the user, is minimized In addition, anytime manual data entry is required there is an opportunity for error introduction.

What is needed is a method and system that allows a financial management system to automatically, and reliably, categorize check-based financial transactions.

SUMMARY

In accordance with one embodiment, a system and method for automatic categorization of check-based financial transactions includes a process for automatic categorization of check-based financial transactions whereby an optical image of a check used to conduct a check-based financial transaction is obtained at the approximate time of the check-based financial transaction. In one embodiment, the time the optical image of a check is obtained, and therefore the approximate time of the check-based financial transaction, is recorded.

In one embodiment, geographical position/location data associated with the user, and/or a user mobile computing system, is obtained periodically, and/or at the time the optical image of the check is obtained.

In one embodiment, Optical Character Recognition (OCR) technology is used to extract image-based financial transaction data from the optical image of the check.

In one embodiment, the image-based financial transaction data and the approximate geographical position/location data is analyzed to transform the data indicating the recorded time the optical image of the check was obtained, and therefore the approximate time of the check-based financial transaction, into data indicating the user's approximate geographical position/location at the approximate time of the check-based financial transaction.

In one embodiment, the data indicating the user's approximate geographical position/location at the approximate time of the check-based financial transaction is used to search mapping and/or merchant location data in a mapping database to identify a most likely merchant payee associated with the check-based financial transaction. In one embodiment, data indicating the products and/or services provided by the identified most likely merchant payee is obtained from a merchant database. In one embodiment, the data indicating the products and/or services provided by the identified most likely merchant payee is used, at least in part, to automatically assign a financial category to the check-based financial transaction and/or transform the category status of the check-based financial transaction.

As shown above, using one embodiment of the system and method for automatic categorization of check-based financial transactions disclosed herein, imaging and OCR technology, along with position/location technology, is combined with mapping databases, including mapping and/or merchant websites, and used to determine a likely merchant payee associated with a check-based financial transaction and the products sold by that merchant payee. This data is then used to determine a financial category to be automatically assigned to the check-based financial transaction. Consequently, using the system and method for automatic categorization of check-based financial transactions disclosed herein, automatic categorization of check-based financial transactions is made possible and is more likely to be accurate. Therefore, using the system and method for automatic categorization of check-based financial transactions disclosed herein, check-based transactions that must currently be manually entered and categorized can be automatically entered into a financial management system and accurately, and automatically, categorized.

In accordance with one embodiment, a system and method for automatic categorization of check-based financial transactions includes a process for automatic categorization of check-based financial transactions whereby an optical image of a check used to conduct a check-based financial transaction is obtained at the approximate time of the check-based financial transaction.

In one embodiment, voice data associated with the check-based financial transaction is obtained from a user and associated with the optical image data of the check used to conduct the check-based financial transaction.

In one embodiment, Optical Character Recognition (OCR) technology is used to extract image-based financial transaction data from the optical image of the check. In one embodiment, voice recognition technology is used to transform the voice data associated with the check-based financial transaction into voice-based financial transaction data.

In one embodiment, the image-based financial transaction data and the voice-based financial transaction data associated with the check-based financial transaction is used, at least in part, to automatically assign a financial category to the check-based financial transaction and/or transform the category status of the check-based financial transaction.

As shown above, using one embodiment of the system and method for automatic categorization of check-based financial transactions disclosed herein, imaging and OCR technology along voice recognition technology, is used to determine a financial category to be automatically assigned to a check-based financial transaction. Consequently, using the system and method for automatic categorization of check-based financial transactions disclosed herein, automatic categorization of check-based financial transactions is made possible, and is more likely to be accurate. Therefore, using the system and method for automatic categorization of check-based financial transactions disclosed herein, check-based transactions that must currently be manually entered and categorized can be automatically entered into a financial management system and accurately, and automatically, categorized.

Figure 1:
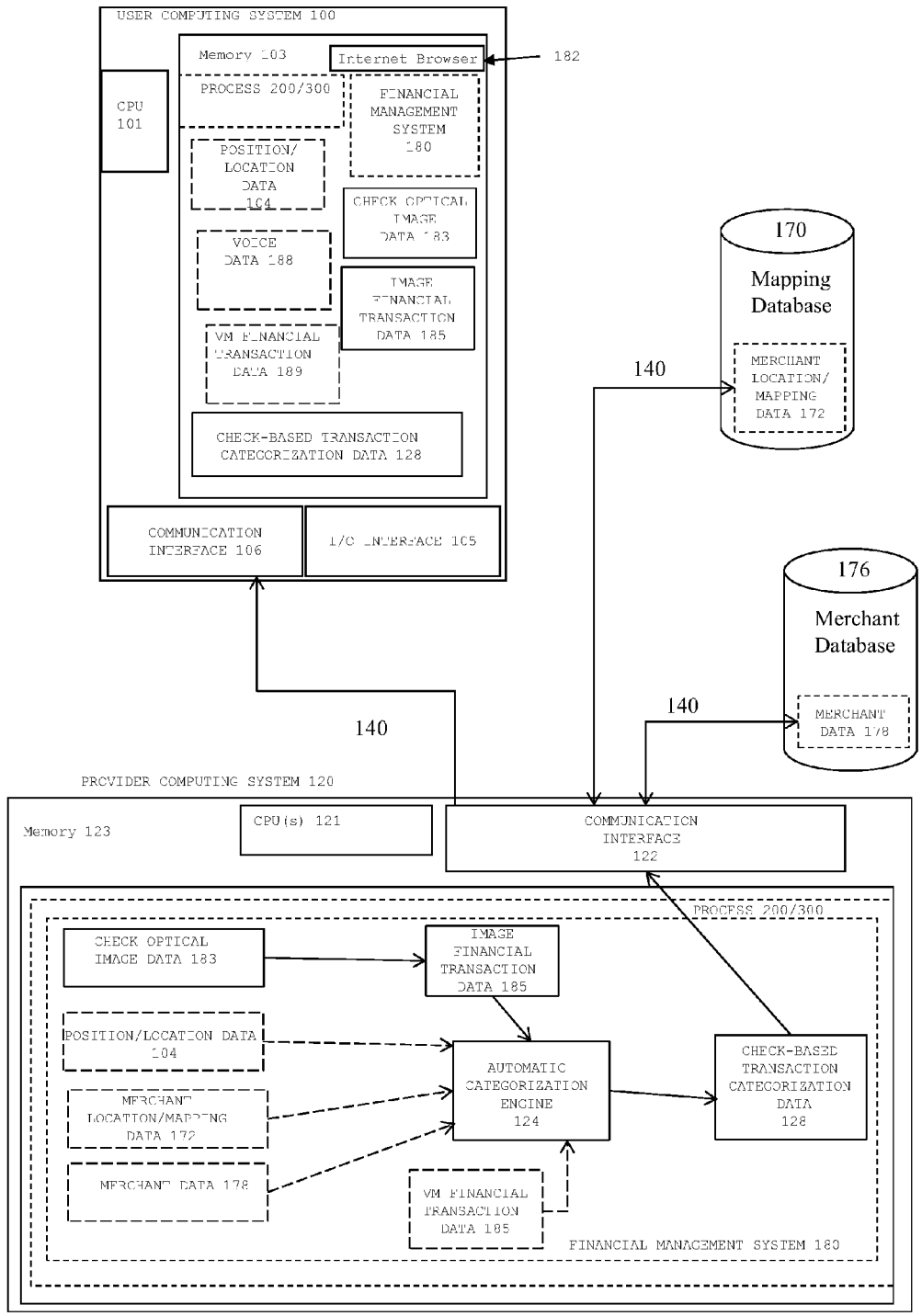
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for automatic categorization of check-based financial transactions includes a process for automatic categorization of check-based financial transactions whereby a user generates a paper check as part of a check-based financial transaction.

Herein the term "check" includes any document or other mechanism used as a payment means associated with a financial transaction. As specific examples, herein the term "check" includes, but is not limited to, a personal check, a business check, a money order, a cashier's check, or any other form of payment used in any financial transaction.

In various embodiments, the paper check is handwritten. In other embodiments, the paper check is printed, and/or otherwise, machine generated. In various embodiments, the paper check includes handwritten or printed check-based financial transaction data, such as payee, payment amount, date, bank account number, routing number, memo data, etc.

In one embodiment, at, or about, the time the paper check is generated, or tendered, an optical image of the check is obtained. In one embodiment, the optical image of the check is obtained using a camera function included as part of a user computing system. In one embodiment, the optical image of the check is obtained using a camera function included as part of a user mobile computing system, such as a mobile phone associated with the user.

As used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Herein, the term "mobile computing system" and "mobile device" are used interchangeably and include, but are not limited to: a portable computer; a two-way pager; a cellular telephone; a smart phone; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; smart phones; digital telephones; two-way pagers; PDAs; media players; or any desired combination of these devices and/or computing systems, that are coupled to perform the processes and/or operations as described herein.

In one embodiment, one or more mobile computing systems are connected by one or more mobile communication networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, the time the optical image of the check is obtained, and therefore the approximate time of the check-based financial transaction, is recorded. In one embodiment, the time the optical image of the check is obtained, and therefore the approximate time of the check-based financial transaction, is obtained by the user computing system, and/or user mobile computing system, used to obtain the optical image of the check.

In one embodiment, geographical position/location data associated with a user computing system, such as a user mobile computing system, is obtained periodically. In one embodiment, the geographical position/location data is obtained/recorded at regular/periodic intervals, such as every second, every few seconds, every minute, every few minutes, etc.

In one embodiment, the geographical position/location data is obtained/recorded "on demand", i.e., when one or more actions take place that trigger the gathering/recording of the geographical position/location data. For instance, in one embodiment, the geographical position/location data is obtained/recorded whenever the user obtains an optical image of a check, and/or activates an icon, and/or otherwise indicates the desire to record the geographical position/location data. Likewise, in one embodiment, the geographical position/location data is obtained/recorded wherever some other trigger event takes place.

In various embodiments, the user computing system is associated with a user traveling by car, bicycle, train, bus, or any other vehicle in an relatively open environment, such as outside, or in a relatively closed environment, such as a mall, stadium, or shopping center. In various embodiments, the user computing system is associated with a user traveling by foot in a relatively open environment, such as outside, or in a relatively closed environment, such as a mall, stadium, or shopping center.

In various embodiments, the geographical position/location data is determined based on analysis of a communication signal emitted by the user computing system and/or the relay stations used by the user computing system. In various embodiments, the geographical position/location data is determined using a Global Positioning Satellite (GPS) system and/or a GPS capability provided with the user computing system. In various embodiments, the geographical position/location data is provided by the user computing system itself via one or more data links. In various embodiments, the geographical position/location data is determined and/or provided by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and process for obtaining location data associated with a computing system is omitted here to avoid detracting from the invention.

In one embodiment, Optical Character Recognition (OCR) technology, and/or pattern matching technology, is used to extract image-based financial transaction data from the optical image of the check.

In one embodiment, using OCR, and/or pattern matching technology, the handwritten, or printed, check-based financial transaction data, such as payee, payment amount, date, bank account number, routing number, memo data, etc. that is included in the obtained optical image of the check is transformed into electronic image-based financial transaction data readable, and usable, by a financial management system in the same way electronic transaction data for electronic transactions is currently processed.

Herein, a financial management system can be, but is not limited to, any data management system implemented on a computing system and/or accessed through a network that gathers financial data, including financial transactional data, from one or more sources and/or has the capability to analyze and categorize at least part of the financial data.

As used herein, the term financial management system includes, but is not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filling or as developed later.

Specific examples of financial management systems include, but are not limited to: Quicken™, available from Intuit, Inc. of Mountain View, Calif.; Quicken On-line™, available from Intuit, Inc. of Mountain View, Calif.; QuickBooks™, available from Intuit, Inc. of Mountain View, Calif.; QuickBooks On-line™, available from Intuit, Inc. of Mountain View, Calif.; Mint™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other financial management systems discussed herein, and/or known to those of skill in the art at the time of filing, and/or as developed after the time of filing.

Current financial management systems are typically software applications which, along with a parent computing system or device, help individuals/users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, financial management systems typically obtain financial transaction information, such as payee identification, payment amount, date of the transaction, time of transaction, etc., via communication with banks, credit card providers, or other financial institutions, using data entry, links to databases, and electronic data transfer systems such as the Open Financial Exchange (OFX) specification or various systems for transferring financial transaction data.

However, as noted above, currently, and absent the processes for automatic categorization of check-based financial transactions discussed herein, financial management systems only process electronic transactions, or financial transactions that are represented by electronic financial transaction data. As a result, check-based transactions are currently largely excluded from processing by financial management systems in that the data related to a check-based financial transaction, such as payee, payment amount, date, etc., must be manually entered into financial management systems.

Using financial management systems, the financial transaction information, payee identification, if available, payment amount, date of the transaction, various tags and/or labels, and other data is used by the financial management system to categorize and/or tag individual financial transactions as a particular type of income or expense, to generate various financial reports, and to create an overview of the user's financial situation based on input from multiple, and often all, available electronic sources of financial information regarding a user. Some currently offered financial management systems then use this financial transaction information to track events, such as purchase events, and to provide various historical personal and business data reports or displays including "to date" data reports, such as historical spending data reports in one or more particular categories and/or tagging schemes, as well as year-end personal and business tax, and/or asset, and/or general financial reports.

However, as noted above, automatic categorization is currently only applicable to electronic transactions, or financial transactions that are represented by electronic financial transaction data. While many financial transactions involving individual consumers do generate electronic financial transaction data, many other financial transactions still rely on the use of paper checks. Currently, these check-based transactions are largely left out the automatic categorization process. Therefore, currently, and absent the processes for automatic categorization of check-based financial transactions discussed herein, the data related to a check-based financial transaction, such as payee, payment amount, date, etc., must be manually entered into financial management systems.

In one embodiment, the data representing the optical image of the check, the recorded time the optical image of the check was obtained, the approximate geographical position/location data, and/or the image-based financial transaction data, is associated, correlated, and stored.

In one embodiment, the approximate geographical position/location data and the recorded time the optical image of the check was obtained is analyzed to transform the data indicating the recorded time the optical image of the check was obtained, and therefore the approximate time of the check-based financial transaction, into data indicating the user's approximate geographical position/location at the approximate time of the check-based financial transaction.

For example, if the recorded time the optical image of the check was obtained is shown to be 11:02 AM on Jan. 3, 2012, and the geographical position/location data from the user computing system shows the user to be at location (X,Y), i.e., latitude "X" and longitude "Y", at 11:00 on Jan. 3, 2012, then this data is transformed into data indicating the user was at position (X, Y) when the optical image of the check was obtained.

In some instances, more than one location may be a potential location associated with the recorded time the optical image of the check was obtained, and therefore the approximate time of the check-based financial transaction. For instance, as a specific example, if the geographical position/location data is obtained from the user computing system every 10 minutes, then it is conceivable that more than one check-based financial transaction may have taken place between geographical position/location data points. For this reason, in some embodiments, the smaller the interval between obtained geographical position/location data, the more accurate the results.

In addition, as noted above, in one embodiment, the geographical position/location data is obtained/recorded "on demand", i.e., when one or more actions take place that trigger the gathering/recording of the geographical position/location data, and, in one embodiment, the geographical position/location data is obtained/recorded whenever the user obtains an optical image of a check, and/or activates an icon, and/or otherwise indicates the desire to record the geographical position/location data. In this way, the most accurate geographical position/location data for the check-based financial transaction is obtained.

In one embodiment, the data indicating the user's approximate position/location at the recorded time the optical image of the check was obtained, and therefore the approximate time of the check-based financial transaction, is used to search mapping and/or merchant location data in a mapping database to identify a most likely merchant payee associated with the check-based financial transaction.

In various embodiments, the mapping and/or merchant location data is obtained from a mapping database such as a mapping website, navigation system, communication network, or GPS system related database. Examples of mapping databases include, but are not limited to: map websites, such as Google Maps™, Yahoo Maps™, etc.; mobile positioning and/or navigation system websites/databases such as those associated with Garmin™ systems, Tom-Tom™ systems, etc.; and/or any other mapping website, navigation system, communication network, or GPS system related database, as discussed herein, and/or as known in the art at the time of filing, and/or as developed after the time of filing; and/or any other source of mapping data as discussed herein, and/or as known in the art at the time of filing, and/or as developed after the time of filing.

In one embodiment, the mapping and/or merchant location data, and/or the image-based financial transaction data, indicates a merchant, or merchants, associated with a given approximate location and this data is used to identify the most likely merchant payee. For instance, continuing with the example above, once it is determined that the user was at position (X, Y) when the check-based financial transaction took place, then the position (X, Y) can be used to search the mapping and/or merchant location data in the mapping database to determine that a "Merchant A" is at the location (X, Y) and therefore the identified most likely merchant payee is "Merchant A".

As noted above, in some instances, more than one location may be a potential location associated with the check-based financial transaction. For instance, as a specific example, if the geographical position/location data is obtained from the user computing system every 10 minutes, then it is conceivable that more than one potential merchant may be identified and the user may have to choose which merchant was involved, or some other mechanism for choosing the most likely merchant payee will have to be utilized. Once again, for this reason as well, in some embodiments, smaller intervals between obtained geographical position/location data, or the use of on-demand geographical position/location data, results in more accurate results.

In addition, in some embodiments, the image-based financial transaction data includes payee data and that data can be used to either identify, or confirm, the most likely merchant payee.

In one embodiment, data indicating the products and/or services provided by the identified most likely merchant payee is obtained from a merchant database.

In some embodiments, the merchant database and the mapping database are the same database. For example, many mapping databases such as a mapping website, navigation system, communication network, or GPS system related databases include not only data indicating a merchant, or merchants, associated with a given approximate location, but also include data indicating products and/or services provided by the merchants at the identified locations.

In some embodiments, the merchant database and the mapping database are different databases and the data indicating the products and/or services provided by the identified most likely merchant payee is obtained from a separate merchant database such as, but not limited to, a website associated with the merchant, a merchant listing, a review website, or any other source of data indicating the products and/or services provided by the identified most likely merchant payee as discussed herein, and/or as known in the art at the time of filing, and/or as developed after the time of filing.

In one embodiment, the data indicating the products and/or services provided by the identified most likely merchant payee is used, at least in part, to automatically assign a financial category to the check-based financial transaction and/or transform the category status of the check-based financial transaction.

In embodiments where the image-based financial transaction data indicates the payee data associated with the check-based financial transaction, the data indicating the products and/or services provided by the identified most likely merchant payee is used, at least in part, to ensure that a financial category automatically assigned the check-based financial transaction based on the payee name data does indeed match the data indicating the products and/or services provided by the merchant payee. Then a financial category is assigned to the check-based financial transaction and/or the financial category status of the check-based financial transaction is transformed.

As a specific illustrative example, assume a user writes a check and obtains check image data at 11:03 on Jan. 3, 2012. Further assume geographic location data from a user mobile computing system indicates that the user was at location (X, Y) at 11:00 on Jan. 3, 2012. Further assume no payee data is available, or discernible, from the optical image of the check using OCR technology.

In this specific example, this location data and time data associated with the check-based financial transaction is transformed into data indicating the user was at position (X,Y) when the check-based financial transaction took place. Then, in this specific example, once it is determined that the user was at position (X, Y) when the check-based financial transaction took place, the position (X, Y) is used to search mapping and/or merchant location data in a mapping database, such as Google Maps™, to determine that merchant "The Auto Shop" is at the location (X, Y) and is therefore the identified most likely merchant payee.

In this specific example, data indicating the products and/or services provided by the "The Auto Shop" is obtained from a merchant database that, in this example, is also Google Maps™. In this specific example, it is found that "The Auto Shop" sells hamburgers and other fast food. Consequently, in this specific example, the check-based financial transaction is automatically categorized as a "dining/entertainment" expense.

As a similar specific illustrative example, assume a user writes a check and obtains check optical image data at 11:03 on Jan. 3, 2012. Assume location data from a user mobile computing system indicates that the user was at location (X, Y) at 11:00 on Jan. 3, 2012. Further assume that OCR analysis of the check optical image data shows the payee as "The Auto Shop". As noted above, using currently available automatic categorization systems, this check-based financial transaction would likely be automatically categorized as an "automobile" expense based on the payee name "The Auto Shop".

In this specific example, the location data and the time data associated with the financial transaction data is transformed into data indicating the user was at position (X,Y) when the check-based financial transaction took place. Then, in this specific example, once it is determined that the user was at position (X, Y) when the check-based financial transaction took place, the position (X, Y) is used to search mapping and/or merchant location data in a mapping database, such as Google Maps™, to determine that "The Auto Shop" is at the location (X, Y) and is therefore the identified most likely merchant payee.

In this specific example, data indicating the products and/or services provided by the "The Auto Shop" is obtained from a merchant database that, in this example, is also Google Maps™. In this specific example, it is found that "The Auto Shop" sells hamburgers and other fast food. Consequently, in this specific example, the check-based financial transaction is automatically categorized as a "dining/entertainment" expense as opposed to the first guess that the check-based financial transaction should be categorized as an automobile expense.

In accordance with one embodiment, a system and method for automatic categorization of check-based financial transactions includes a process for automatic categorization of check-based financial transactions whereby a user generates a paper check as part of a check-based financial transaction.

As noted above, in various embodiments, the paper check is handwritten. In other embodiments, the paper check is printed, and/or otherwise, machine generated. In various embodiments, the paper check includes handwritten or printed check-based financial transaction data, such as payee, payment amount, date, bank account number, routing number, memo data, etc.

In one embodiment, at, or about, the time the paper check is generated, or tendered, an optical image of the check is obtained. In one embodiment, the optical image of the check is obtained using a camera function included as part of a user computing system. In one embodiment, the optical image of the check is obtained using a camera function included as part of a user mobile computing system, such as a mobile phone associated with the user.

In one embodiment, voice data, such as voice memo data is obtained from the user. In various embodiments, the voice data is provided by the user via a user computing system, such as a user mobile computing system. In some embodiments, the voice data is provided by the user via the same user computing system utilized to obtain the optical image of the check.

In various embodiments, the voice data includes, but is not limited to, information indicating the check-based financial transaction for which the check is being written, the check number, a proposed categorization of the check-based financial transaction, the business associated with the check-based financial transaction, the location of the check-based financial transaction, and/or any other check-based financial transaction data such as, but not limited to, the payee, the amount, date, etc.

In one embodiment, Optical Character Recognition (OCR) technology, and/or pattern matching technology, is used to extract image-based financial transaction data from the optical image of the check.

In one embodiment, using OCR, and/or pattern matching technology, the handwritten, or printed, check-based financial transaction data, such as payee, payment amount, date, bank account number, routing number, memo data, etc. that is included in the obtained optical image of the check is transformed into electronic image-based financial transaction data readable, and usable, by a financial management system in the same way electronic transaction data for electronic transactions is currently processed.

In one embodiment, the voice data is processed by a voice recognition system, such as voice recognition software, to transform the voice data into voice-based financial transaction data readable, and usable, by a financial management system in the same way electronic transaction data for electronic transactions is currently processed.

In one embodiment, the data representing the optical image of the check, the voice-based financial transaction data, and/or the image-based financial transaction data, is associated, correlated, and stored.

In one embodiment, the voice-based financial transaction data, and/or the image-based financial transaction data is analyzed to automatically assign a financial category to the check-based financial transaction and/or transform the category status of the check-based financial transaction.

In many cases, the voice-based financial transaction data will indicate the category to assign to the check-based financial transaction and will include the same type of data as the image-based financial transaction data, such payee data associated with the check-based financial transaction. In these cases, the redundancy of the data can be used as a built-in double-check mechanism to ensure that a financial category automatically assigned the check-based financial transaction based on the payee name data does indeed match the voice-based financial transaction data, and vice-versa.

Hardware System Architecture

FIG. 1 is a block diagram of an exemplary hardware architecture for implementing one embodiment of a system and method for automatic categorization of check-based financial transactions, such as exemplary process 200 (FIG. 2) and/or exemplary process 300 (FIG. 3) discussed herein, that, returning to FIG. 1, includes: a user computing system 100, e.g., a first computing system; a provider computing system 120, e.g., a second computing system; a mapping database 170, and a merchant database 176, all operatively coupled by various communications links 140.

As seen in FIG. 1, computing system 100 typically includes a central processing unit (CPU) 101, an input/output (I/O) interface 105, a communications interface 106; and a memory system 103.

As noted above, as used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As also noted above, the term "mobile computing system" and "mobile device" are used interchangeably and include, but are not limited to: a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, memory system 103 includes all, or part, of a financial management system 180, such as any financial management system discussed herein, known in the art at the time of filing, and/or as developed thereafter.

In one embodiment, memory system 103 includes check optical image data 183 representing an optical image of a check used for a check-based financial transaction conducted by a user.

Herein the term "check" includes any document used as payment associated with a financial transaction. As specific examples, herein the term "check" includes, but is not limited to a personal check, a business check, a money order, a cashier's check, or any other form of payment used in any financial transaction.

In various embodiments, the paper check is handwritten. In other embodiments, the paper check is printed, and/or otherwise, machine generated. In various embodiments, the paper check includes handwritten or printed check-based financial transaction data, such as payee, payment amount, date, bank account number, routing number, memo data, etc.

In one embodiment, at, or about, the time the paper check is generated, or tendered, check optical image data 183 is obtained. In one embodiment, check optical image data 183 is obtained using a camera function (not shown in FIG. 1) included as part of user computing system 100. In one embodiment, check optical image data 183 is obtained using a camera function included as part of a user mobile computing system, such as a mobile phone associated with the user.

In one embodiment, the time check optical image data 183 is obtained, and therefore the approximate time of the check-based financial transaction, is recorded and, in one embodiment, included with check optical image data 183.

In one embodiment, Optical Character Recognition (OCR) technology, and/or pattern matching technology, is used to extract image-based financial transaction data, such as image financial transaction data 185 from check optical image data 183.

In one embodiment, using OCR, and/or pattern matching technology, the handwritten, or printed, check-based financial transaction data, such as payee, payment amount, date, bank account number, routing number, memo data, etc. that is included in the obtained check optical image data 183 is transformed into image financial transaction data 185 readable, and usable, by financial management system 180 in the same way electronic transaction data for electronic transactions is currently processed.

In one embodiment, memory system 103 includes all, or part, of position/location data 104 associated with user computing system 100, such as a user mobile computing system. In one embodiment, position/location data 104 is obtained/recorded at regular/periodic intervals, such as every second, every few seconds, every minute, every few minutes, etc.

In one embodiment, position/location data 104 is obtained/recorded "on demand", i.e., when one or more actions take place that trigger the gathering/recording of position/location data 104. For instance, in one embodiment, position/location data 104 is obtained/recorded whenever the user obtains check optical image data 183, and/or activates an icon, and/or otherwise indicates the desire to record the position/location data 104. Likewise, in one embodiment, position/location data 104 is obtained/recorded wherever some other trigger event takes place.

In one embodiment, check optical image data 183, the recorded time check optical image data 183 was obtained, the position/location data 104, and/or the image financial transaction data 185, is associated, correlated, and stored.

As discussed in more detail below, in one embodiment, the position/location data 104 and the recorded time check optical image data 183 was obtained is analyzed to transform/correlate the recorded time data, and therefore the approximate time of the check-based financial transaction, into position/location data 104. In other embodiments, position/location data 104 is obtained on demand at the time the check optical image data 183 was obtained so the position/location data 104 indicates user computing system's position/location data 104 at the time the check optical image data 183 was obtained automatically.

In various embodiments, position/location data 104 is determined based on analysis of a communication signal emitted by user computing system 100 and/or the relay stations used by user computing system 100. In various embodiments, position/location data 104 is determined using a Global Positioning Satellite (GPS) system and/or a GPS capability provided with user computing system 100. In various embodiments, position/location data 104 is provided by user computing system 100 itself via one or more data links. In various embodiments, position/location data 104 is determined and/or provided by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and process for obtaining position/location data 104 associated with user computing system 100 is omitted here to avoid detracting from the invention.

In various embodiments, position/location data 104 is saved and/or stored in memory 103 and at least a portion of position/location data 104 is sent to provider computing system 120.

In one embodiment, memory system 103 includes all, or part, of check-based transaction categorization data 128 sent to user computing system 100, and memory 103, from automatic categorization engine 124, and memory 123, of provider computing system 120.

Returning to FIG. 1, computing system 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, user computing system 100, whether available or known at the time of filing or as later developed.

As discussed in more detail below, in one embodiment, a process for automatic categorization of check-based financial transactions, and/or a financial management system, are entered, in whole, or in part, into computing system 100 via I/O interface 105, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

Computing system 100 can be any computing system as defined herein and/or as known in the art at the time of filing and/or as developed thereafter, that includes components that can execute all, or part, of a process for automatic categorization of check-based financial transactions, and/or a financial management system, in accordance with at least one of the embodiments as described herein.

Also shown in FIG. 1 is mapping database 170. In one embodiment, mapping database 170 is a data storage device, a designated server system or computing system, or a designated portion of one or more server systems or computing systems, such as computing systems 100 and 120, or a distributed database, or an external and/or portable hard drive. In one embodiment, mapping database 170 is a dedicated mass storage device implemented in software, hardware, or a combination of hardware and software. In one embodiment, mapping database 170 includes a web-based function.

As noted above, in one embodiment, mapping database 170 is any mapping database such as a mapping website, navigation system, communication network, or GPS system related database. Examples of mapping databases include, but are not limited to: map websites, such as Google Maps™, Yahoo Maps™, etc.; mobile positioning and/or navigation system websites/databases such as those associated with Garmin™ systems, Tom-Tom™ systems, etc.; and/or any other mapping website, navigation system, communication network, or GPS system related database, as discussed herein, and/or as known in the art at the time of filing, and/or as developed after the time of filing; and/or any other source of mapping data as discussed herein, and/or as known in the art at the time of filing, and/or as developed after the time of filing.

In one embodiment, mapping database 170 includes merchant location/mapping data 172. In one embodiment, mapping database 170 and merchant location/mapping data 172 are associated with process 200 and/or process 300.

In one embodiment, mapping database 170 and merchant location/mapping data 172 indicates a merchant, or merchants, associated with a given approximate location and this data is used to identify the most likely merchant payee. For instance, continuing with the example above, once it is determined that the user was at position (X, Y) when the check-based financial transaction took place, then the position (X, Y) can be used to search the mapping and/or merchant location data in the mapping database to determine that a "Merchant A" is at the location (X, Y) and therefore the identified most likely merchant payee is "Merchant A".

Also shown in FIG. 1 is merchant database 176. In one embodiment, merchant database 176 is a data storage device, a designated server system or computing system, or a designated portion of one or more server systems or computing systems, such as computing systems 100 and 120, or a distributed database, or an external and/or portable hard drive. In one embodiment, merchant database 176 is a dedicated mass storage device implemented in software, hardware, or a combination of hardware and software. In one embodiment, merchant database 176 includes a web-based function.

As noted above, in one embodiment, merchant database 176 and mapping database 170 are the same database. For example, many mapping databases such as a mapping website, navigation system, communication network, or GPS system related database include not only data indicating a merchant, or merchants, associated with a given approximate location, but also include merchant data 178 indicating products and/or services provided by the merchants at the identified locations.

In some embodiments, merchant database 176 and mapping database 170 are different databases and merchant data 178 indicating the products and/or services provided by the identified most likely merchant payee is obtained from a separate merchant database 176 such as, but not limited to, a website associated with the merchant, a merchant listing, a review website, or any other source of data indicating the products and/or services provided by the identified most likely merchant payee as discussed herein, and/or as known in the art at the time of filing, and/or as developed after the time of filing.

As discussed below, in one embodiment, merchant data 178 indicating the products and/or services provided by the identified most likely merchant payee is analyzed by one or more processors, such as CPU(s) 101 and/or 121, to determine a likely financial categorization for check optical image data 183.

As also seen in FIG. 1, provider computing system 120 typically includes a central processing unit (CPUs) 121, communications interface 122, and a memory system 123.

In one embodiment, memory 123 includes at least part of process 200. In one embodiment, memory 123, and/or process 200, includes: at least part of check optical image data 183 from user computing system 100, including data indicating a time associated with the check-based financial transaction of check optical image data 183; at least part of image financial transaction data 185; at least part of position/location data 104 from user computing system 100; at least part of merchant location/mapping data 172 from mapping database 170; and at least part of merchant data 178 from merchant database 176.

In one embodiment, at least part of check optical image data 183, including data indicating a time associated with the financial transaction of check optical image data 183, at least part of image financial transaction data 185, position/location data 104, merchant location/mapping data 172, and merchant data 178, are provided to automatic categorization engine 124.

In one embodiment, automatic categorization engine 124 automatically uses at least part of check optical image data 183, including data indicating a time associated with the financial transaction of check optical image data 183, at least part of image financial transaction data 185, position/location data 104, merchant location/mapping data 172, and merchant data 178 to automatically assign check-based transaction categorization data 128 to the financial transaction of check optical image data 183 and to transform the category status of the financial transaction of check optical image data 183.

In one embodiment, the check optical image data 183 indicating the approximate time of the financial transaction is analyzed along with position/location data 104 to transform the check optical image data 183 indicating the approximate time of the financial transaction and position/location data 104 into data indicating the user's approximate position/location at the approximate time of the financial transaction. In one embodiment, the data indicating the user's approximate position/location at the approximate time of the financial transaction is used to search merchant location mapping data 172 to identify a most likely merchant payee associated with the financial transaction. In one embodiment, merchant data 178 indicating the products and/or services provided by the identified most likely merchant payee is obtained. In one embodiment, merchant data 178 indicating the products and/or services provided by the identified most likely merchant payee is used, at least in part, by automatic categorization engine 124 to automatically assign check-based transaction categorization data 128 to the financial transaction of check optical image data 183 and/or transform the category status of the financial transaction.

In one embodiment, check-based transaction categorization data 128 is sent to user computing system 100 and applied to the financial transaction of check optical image data 183.

Computing system 120 can be any computing system as defined herein and/or as known in the art at the time of filing and/or as developed thereafter, that includes components that can execute all, or part, of process for automatic categorization of check-based financial transactions 200 in accordance with at least one of the embodiments as described herein.

In one embodiment, memory system 103 includes all, or part, of voice data 188, such as voice memo data obtained from the user. In various embodiments, voice data 188 is provided by the user via user computing system 100, such as a user mobile computing system. In some embodiments, voice data 188 is provided by the user via the same user computing system utilized to obtain the optical image of the check.

In various embodiments, voice data 188 includes, but is not limited to, information indicating the check-based financial transaction for which the check is being written, the check number, a proposed categorization of the check-based financial transaction, the business associated with the check-based financial transaction, the location of the check-based financial transaction, and/or any other check-based financial transaction data such as, but not limited to, the payee, the amount, date, etc.

In various embodiments, a voice recognition system (not shown in FIG. 1), such as voice recognition software, is used to transform voice data 188 into voice-based financial transaction data, such as VM financial transaction data 189, readable, and usable, by financial management system 200 or 300 in the same way electronic transaction data for electronic transactions is currently processed.

In one embodiment, the check optical image data 183, VM financial transaction data 189, and/or the image financial transaction data 185, is associated, correlated, and stored.

In one embodiment, at least part of VM financial transaction data 189, and/or image financial transaction data 185 is sent to provider computing system 120 and is analyzed by automatic categorization engine 124 to generate check-based transaction categorization data 128. In various embodiments, check-based transaction categorization data 128 includes data indicating a financial category to be applied to the check-based financial transaction and/or transform the category status of the check-based financial transaction.

In one embodiment, computing systems 100 and 120, and databases 170 and 176, are linked together via communications channels 140. In various embodiments, any, or all, of communications channels 140 can be, but are not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

In one embodiment, computing systems 100 and 120, and databases 170 and 176 are part of a cloud computing environment.

Those of skill in the art will readily recognize that the components shown in FIG. 1, and their respective sub-components are shown for illustrative purposes only and that architectures with more or fewer components can implement, and benefit from, the invention. Moreover, one or more components may be located remotely from their respective system and accessed via network, as discussed herein. In addition, the particular type of, and configuration of, computing systems 100 and 120, and databases 170 and 176 are not relevant.

Those of skill in the art will readily recognize that the components shown in FIG. 1, and their respective sub-components, are shown for illustrative purposes only and that architectures with more or fewer components can implement, and benefit from, one or more embodiments. Moreover, one or more components of user computing systems 100 and 120, and databases 170 and 176 may be located remotely from their respective system and accessed via communication channels 140. In addition, the particular type of, and configuration of, computing systems 100 and 120, and databases 170 and 176 are not relevant.

As discussed in more detail below, in one embodiment, a process for automatic categorization of check-based financial transactions, and/or a financial management system, and/or data associated with one or more users, is stored, in whole, or in part, in one or more memory systems, and/or cache memories, associated with one or more computing systems. As used herein, a memory refers to a volatile memory, a non-volatile memory, or any combination of the two.

Although a process for automatic categorization of check-based financial transactions, and/or a financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for automatic categorization of check-based financial transactions, and/or a financial management system, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 121. In one embodiment, execution of a process by CPU 101 or 121 results in the operations of an agent computer process (not shown) and/or a rule computer process (not shown).

In one embodiment, a process for automatic categorization of check-based financial transactions, and/or a financial management system, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system or the medium may be removable and/or remote from the computing system.

Process

Herein, the term "user" and "user consumer" are used interchangeably to denote any party and/or entity that interfaces with, and/or to whom information is provided by, a process for automatic categorization of check-based financial transactions, and/or a person and/or entity that interfaces with, and/or to whom information is provided by, a process for automatic categorization of check-based financial transactions, and/or a legal guardian of person and/or entity that interfaces with, and/or to whom information is provided by, a process for automatic categorization of check-based financial transactions, and/or an authorized agent of any party and/or person and/or entity that interfaces with, and/or to whom information is provided by, a process for automatic categorization of check-based financial transactions.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

In accordance with one embodiment, a system and method for automatic categorization of check-based financial transactions includes a process for automatic categorization of check-based financial transactions whereby an optical image of a check used to conduct a check-based financial transaction is obtained at the approximate time of the check-based financial transaction. In one embodiment, the time the optical image of a check is obtained, and therefore the approximate time of the check-based financial transaction, is recorded.

In one embodiment, geographical position/location data associated with the user, and/or a user mobile computing system, is obtained periodically, and/or at the time the optical image of the check is obtained.

In one embodiment, Optical Character Recognition (OCR) technology is used to extract image-based financial transaction data from the optical image of the check.

In one embodiment, the image-based financial transaction data and the approximate geographical position/location data is analyzed to transform the data indicating the recorded time the optical image of the check was obtained, and therefore the approximate time of the check-based financial transaction, into data indicating the user's approximate geographical position/location at the approximate time of the check-based financial transaction.

In one embodiment, the data indicating the user's approximate geographical position/location at the approximate time of the check-based financial transaction is used to search mapping and/or merchant location data in a mapping database to identify a most likely merchant payee associated with the check-based financial transaction. In one embodiment, data indicating the products and/or services provided by the identified most likely merchant payee is obtained from a merchant database. In one embodiment, the data indicating the products and/or services provided by the identified most likely merchant payee is used, at least in part, to automatically assign a financial category to the check-based financial transaction and/or transform the category status of the check-based financial transaction.

Figure 2:
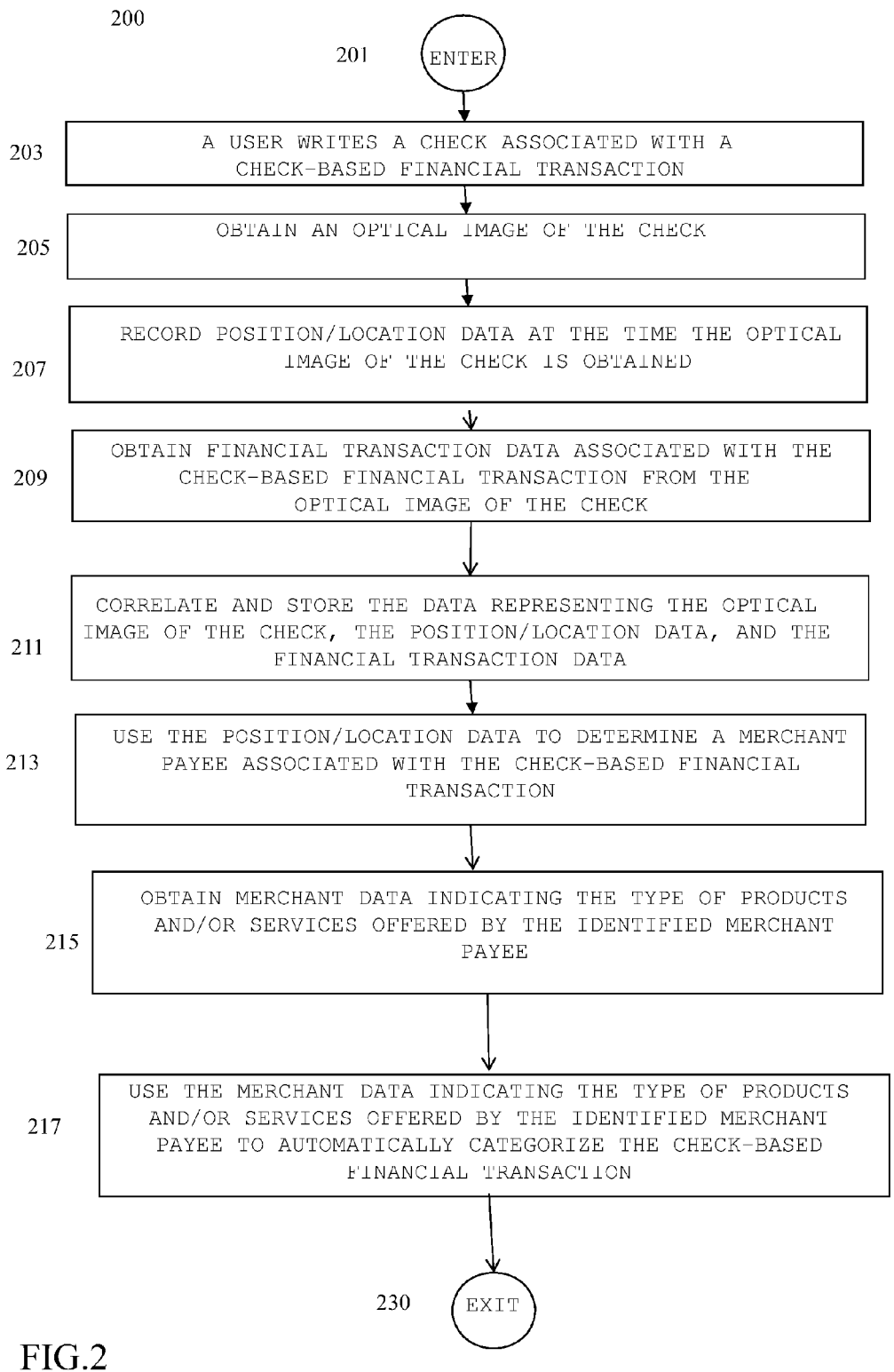
FIG. 2 is a flow chart depicting a process for automatic categorization of check-based financial transactions in accordance with one embodiment.

FIG. 2 is a flow chart depicting a process for automatic categorization of check-based financial transactions 200 in accordance with one embodiment. Process for automatic categorization of check-based financial transactions 200 begins at ENTER OPERATION 201 of FIG. 2 and process flow proceeds to A USER WRITES A CHECK ASSOCIATED WITH A CHECK-BASED FINANCIAL TRANSACTION OPERATION 203.

In one embodiment, at A USER WRITES A CHECK ASSOCIATED WITH A CHECK-BASED FINANCIAL TRANSACTION OPERATION 203 a user generates a paper check as part of a check-based financial transaction.

In various embodiments, the paper check is handwritten. In other embodiments, the paper check is printed, and/or otherwise, machine generated. In various embodiments, the paper check includes handwritten or printed check-based financial transaction data, such as payee, payment amount, date, bank account number, routing number, memo data, etc.

In one embodiment, once a user generates a paper check as part of a check-based financial transaction at A USER WRITES A CHECK ASSOCIATED WITH A CHECK-BASED FINANCIAL TRANSACTION OPERATION 203, process flow proceeds to OBTAIN AN OPTICAL IMAGE OF THE CHECK OPERATION 205.

In one embodiment, at OBTAIN AN OPTICAL IMAGE OF THE CHECK OPERATION 205 an optical image of the check used to conduct the check-based financial transaction of A USER WRITES A CHECK ASSOCIATED WITH A CHECK-BASED FINANCIAL TRANSACTION OPERATION 203 is obtained at the approximate time of the check-based financial transaction.

In one embodiment, at OBTAIN AN OPTICAL IMAGE OF THE CHECK OPERATION 205 at, or about, the time the paper check is generated, or tendered, at A USER WRITES A CHECK ASSOCIATED WITH A CHECK-BASED FINANCIAL TRANSACTION OPERATION 203 an optical image of the check is obtained. In one embodiment, the optical image of the check is obtained using a camera function included as part of a user computing system, such as user computing system 100 of FIG. 1. In one embodiment, the optical image of the check is obtained using a camera function included as part of a user mobile computing system, such as a mobile phone associated with the user.

Returning to FIG. 2, in one embodiment, at OBTAIN AN OPTICAL IMAGE OF THE CHECK OPERATION 205 the time the optical image of the check is obtained, and therefore the approximate time of the check-based financial transaction, is recorded. In one embodiment, at OBTAIN AN OPTICAL IMAGE OF THE CHECK OPERATION 205 the time the optical image of the check is obtained, and therefore the approximate time of the check-based financial transaction, is obtained by the user computing system, and/or user mobile computing system, such as user computing system 100 of FIG. 1, used to obtain the optical image of the check.

In one embodiment, once an optical image of the check used to conduct the check-based financial transaction of A USER WRITES A CHECK ASSOCIATED WITH A CHECK-BASED FINANCIAL TRANSACTION OPERATION 203 is obtained at the approximate time of the check-based financial transaction at OBTAIN AN OPTICAL IMAGE OF THE CHECK OPERATION 205, process flow proceeds to RECORD POSITION/LOCATION DATA AT THE TIME THE OPTICAL IMAGE OF THE CHECK IS OBTAINED OPERATION 207.

In one embodiment, at RECORD POSITION/LOCATION DATA AT THE TIME THE OPTICAL IMAGE OF THE CHECK IS OBTAINED OPERATION 207 geographical position/location data associated with the user, and/or a user mobile computing system, is obtained periodically, and/or at the approximate time the optical image of the check is obtained at OBTAIN AN OPTICAL IMAGE OF THE CHECK OPERATION 205.

In one embodiment, at RECORD POSITION/LOCATION DATA AT THE TIME THE OPTICAL IMAGE OF THE CHECK IS OBTAINED OPERATION 207 geographical position/location data, is obtained from a user computing system, such as a mobile computing system, on a periodic, and/or on demand, basis.

In one embodiment, at RECORD POSITION/LOCATION DATA AT THE TIME THE OPTICAL IMAGE OF THE CHECK IS OBTAINED OPERATION 207 the geographical position/location data, such as position/location data 104 of FIG. 1, is obtained from a user computing system, such as user computing system 100 of FIG. 1.

As noted above, as used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Returning to FIG. 2, in one embodiment, at RECORD POSITION/LOCATION DATA AT THE TIME THE OPTICAL IMAGE OF THE CHECK IS OBTAINED OPERATION 207 the geographical position/location data, such as position/location data 104 of FIG. 1, is obtained from a user computing system, such as user computing system 100 of FIG. 1, which is a user mobile device. Herein, the term "mobile computing system" and "mobile device" are used interchangeably and include, but are not limited to: a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, one or more user computing systems of RECORD POSITION/LOCATION DATA AT THE TIME THE OPTICAL IMAGE OF THE CHECK IS OBTAINED OPERATION 207 are connected by one or more mobile communication networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Returning to FIG. 2, in one embodiment, at RECORD POSITION/LOCATION DATA AT THE TIME THE OPTICAL IMAGE OF THE CHECK IS OBTAINED OPERATION 207 the geographical position/location data is obtained/recorded at regular/periodic intervals, such as every second, every few seconds, every minute, every few minutes, etc. In one embodiment, the geographical position/location data is obtained/recorded "on demand", i.e., when one or more actions take place that trigger the gathering/recording of the geographical position/location data.

In one embodiment, at RECORD POSITION/LOCATION DATA AT THE TIME THE OPTICAL IMAGE OF THE CHECK IS OBTAINED OPERATION 207 the geographical position/location data is obtained/recorded "on demand", i.e., when one or more actions take place that trigger the gathering/recording of the geographical position/location data. For instance, in one embodiment, the geographical position/location data is obtained/recorded at RECORD POSITION/LOCATION DATA AT THE TIME THE OPTICAL IMAGE OF THE CHECK IS OBTAINED OPERATION 207 whenever the user obtains an optical image of a check at OBTAIN AN OPTICAL IMAGE OF THE CHECK OPERATION 205, and/or activates an icon, and/or otherwise indicates the desire to record the geographical position/location data. Likewise, in one embodiment, the geographical position/location data is obtained/recorded wherever some other trigger event takes place.

In various embodiments, the user computing system of RECORD POSITION/LOCATION DATA AT THE TIME THE OPTICAL IMAGE OF THE CHECK IS OBTAINED OPERATION 207 is associated with a user traveling by car, bicycle, train, bus, or any other vehicle in an relatively open environment, such as outside, or in a relatively closed environment, such as a mall, stadium, or shopping center. In various embodiments, the user computing system is associated with a user traveling by foot in a relatively open environment, such as outside, or in a relatively closed environment, such as a mall, stadium, or shopping center.

In various embodiments, the geographical position/location data of RECORD POSITION/LOCATION DATA AT THE TIME THE OPTICAL IMAGE OF THE CHECK IS OBTAINED OPERATION 207 is determined based on analysis of a communication signal emitted by the user computing system of RECORD POSITION/LOCATION DATA AT THE TIME THE OPTICAL IMAGE OF THE CHECK IS OBTAINED OPERATION 207 and/or the relay stations used by the user computing system.

In various embodiments, the geographical position/location data of RECORD POSITION/LOCATION DATA AT THE TIME THE OPTICAL IMAGE OF THE CHECK IS OBTAINED OPERATION 207 is determined using a Global Positioning Satellite (GPS) system and/or a GPS capability provided with the user computing system of RECORD POSITION/LOCATION DATA AT THE TIME THE OPTICAL IMAGE OF THE CHECK IS OBTAINED OPERATION 207.

In various embodiments, the geographical position/location data is provided by the user computing system itself via one or more data links.

In various embodiments, the geographical position/location data of RECORD POSITION/LOCATION DATA AT THE TIME THE OPTICAL IMAGE OF THE CHECK IS OBTAINED OPERATION 207 is determined and/or provided by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining location data associated with a computing system. Consequently, a more detailed discussion of any particular means, method, system, algorithm, procedure, and process for obtaining location data associated with a computing system is omitted here to avoid detracting from the invention.

In various embodiments, the geographical position/location data, such as position/location data 104 of FIG. 1, is saved and/or stored, in a memory, such as memory 103 and/or memory 123 of FIG. 1.

Returning to FIG. 1, in one embodiment, once geographical position/location data is obtained from a user computing system, such as a mobile computing system, on a periodic, and/or on demand, basis at RECORD POSITION/LOCATION DATA AT THE TIME THE OPTICAL IMAGE OF THE CHECK IS OBTAINED OPERATION 207, process flow proceeds to OBTAIN FINANCIAL TRANSACTION DATA ASSOCIATED WITH THE CHECK BASED FINANCIAL TRANSACTION FROM THE OPTICAL IMAGE OF THE CHECK OPERATION 209.

In one embodiment, at OBTAIN FINANCIAL TRANSACTION DATA ASSOCIATED WITH THE CHECK BASED FINANCIAL TRANSACTION FROM THE OPTICAL IMAGE OF THE CHECK OPERATION 209 Optical Character Recognition (OCR) technology is used to extract image-based financial transaction data from the optical image of the check of OBTAIN AN OPTICAL IMAGE OF THE CHECK OPERATION 205.

In one embodiment, at OBTAIN FINANCIAL TRANSACTION DATA ASSOCIATED WITH THE CHECK BASED FINANCIAL TRANSACTION FROM THE OPTICAL IMAGE OF THE CHECK OPERATION 209 OCR technology, and/or pattern matching technology, is used to extract image-based financial transaction data from the optical image of the check.

In one embodiment, at OBTAIN FINANCIAL TRANSACTION DATA ASSOCIATED WITH THE CHECK BASED FINANCIAL TRANSACTION FROM THE OPTICAL IMAGE OF THE CHECK OPERATION 209 using OCR, and/or pattern matching technology, the handwritten, or printed, check-based financial transaction data, such as payee, payment amount, date, bank account number, routing number, memo data, etc. that is included in the obtained optical image of the check is transformed into electronic image-based financial transaction data, such as image financial transaction data 183 of FIG. 1, readable, and usable, by a financial management system, such as financial management system 180 of FIG. 1, in the same way electronic transaction data for electronic transactions is currently processed.

Herein, a financial management system can be, but is not limited to, any data management system implemented on a computing system and/or accessed through a network that gathers financial data, including financial transactional data, from one or more sources and/or has the capability to analyze and categorize at least part of the financial data, as discussed herein, and/or as known in the art at the time of filing, and/or as developed/made available after the time of filing.

In one embodiment, once OCR technology is used to extract image-based financial transaction data from the optical image of the check of OBTAIN AN OPTICAL IMAGE OF THE CHECK OPERATION 205 at OBTAIN FINANCIAL TRANSACTION DATA ASSOCIATED WITH THE CHECK BASED FINANCIAL TRANSACTION FROM THE OPTICAL IMAGE OF THE CHECK OPERATION 209, process flow proceeds to CORRELATE AND STORE THE DATA REPRESENTING THE OPTICAL IMAGE OF THE CHECK, THE POSITION/LOCATION DATA, AND THE FINANCIAL TRANSACTION DATA OPERATION 211.

In one embodiment, at CORRELATE AND STORE THE DATA REPRESENTING THE OPTICAL IMAGE OF THE CHECK, THE POSITION/LOCATION DATA, AND THE FINANCIAL TRANSACTION DATA OPERATION 211, the data representing the optical image of the check of OBTAIN AN OPTICAL IMAGE OF THE CHECK OPERATION 205, the recorded time the optical image of the check was obtained of OBTAIN AN OPTICAL IMAGE OF THE CHECK OPERATION 205, the approximate geographical position/location data of RECORD POSITION/LOCATION DATA AT THE TIME THE OPTICAL IMAGE OF THE CHECK IS OBTAINED OPERATION 207, and/or the image-based financial transaction data of OBTAIN FINANCIAL TRANSACTION DATA ASSOCIATED WITH THE CHECK BASED FINANCIAL TRANSACTION FROM THE OPTICAL IMAGE OF THE CHECK OPERATION 209, is associated, correlated, and stored.

In one embodiment, at CORRELATE AND STORE THE DATA REPRESENTING THE OPTICAL IMAGE OF THE CHECK, THE POSITION/LOCATION DATA, AND THE FINANCIAL TRANSACTION DATA OPERATION 211, the data representing the optical image of the check of OBTAIN AN OPTICAL IMAGE OF THE CHECK OPERATION 205, the recorded time the optical image of the check was obtained of OBTAIN AN OPTICAL IMAGE OF THE CHECK OPERATION 205, the approximate geographical position/location data of RECORD POSITION/LOCATION DATA AT THE TIME THE OPTICAL IMAGE OF THE CHECK IS OBTAINED OPERATION 207, and/or the image-based financial transaction data of OBTAIN FINANCIAL TRANSACTION DATA ASSOCIATED WITH THE CHECK BASED FINANCIAL TRANSACTION FROM THE OPTICAL IMAGE OF THE CHECK OPERATION 209, is associated, correlated, and stored in a memory system, such as memory 103 and/or 123 of FIG. 1, as check optical image data 183, position location data 104, image financial transaction data 185, respectively.

Returning to FIG. 2, once the data representing the optical image of the check, the recorded time the optical image of the check was obtained, the approximate geographical position/location data, and/or the image-based financial transaction data, is associated, correlated, and stored at CORRELATE AND STORE THE DATA REPRESENTING THE OPTICAL IMAGE OF THE CHECK, THE POSITION/LOCATION DATA, AND THE FINANCIAL TRANSACTION DATA OPERATION 211, process flow proceeds to USE THE POSITION/LOCATION DATA TO DETERMINE A MERCHANT PAYEE ASSOCIATED WITH THE CHECK-BASED FINANCIAL TRANSACTION OPERATION 213.

In one embodiment, at USE THE POSITION/LOCATION DATA TO DETERMINE A MERCHANT PAYEE ASSOCIATED WITH THE CHECK-BASED FINANCIAL TRANSACTION OPERATION 213 the data indicating the user's approximate geographical position/location at the approximate time of the check-based financial transaction is used to search mapping and/or merchant location data in a mapping database to identify a most likely merchant payee associated with the check-based financial transaction.

In one embodiment, at USE THE POSITION/LOCATION DATA TO DETERMINE A MERCHANT PAYEE ASSOCIATED WITH THE CHECK-BASED FINANCIAL TRANSACTION OPERATION 213 the image-based financial transaction data of OBTAIN FINANCIAL TRANSACTION DATA ASSOCIATED WITH THE CHECK BASED FINANCIAL TRANSACTION FROM THE OPTICAL IMAGE OF THE CHECK OPERATION 209 and the approximate geographical position/location data of RECORD POSITION/LOCATION DATA AT THE TIME THE OPTICAL IMAGE OF THE CHECK IS OBTAINED OPERATION 207 is analyzed to transform the data indicating the recorded time the optical image of the check was obtained, and therefore the approximate time of the check-based financial transaction, into data indicating the user's approximate geographical position/location at the approximate time of the check-based financial transaction.

In one embodiment, at USE THE POSITION/LOCATION DATA TO DETERMINE A MERCHANT PAYEE ASSOCIATED WITH THE CHECK-BASED FINANCIAL TRANSACTION OPERATION 213 the approximate geographical position/location data and the recorded time the optical image of the check was obtained is analyzed using one or more processors, such as CPU 101 and/or CPUs 121, and/or automatic categorization engine 124 of FIG. 1, to transform the data indicating the recorded time the optical image of the check was obtained, and therefore the approximate time of the check-based financial transaction, into data indicating the user's approximate geographical position/location at the approximate time of the check-based financial transaction.

For example, if the recorded time the optical image of the check was obtained is shown to be 11:02 AM on Jan. 3, 2012, and the geographical position/location data from the user computing system shows the user to be at location (X, Y), i.e., latitude "X" and longitude "Y", at 11:00 on Jan. 3, 2012, then this data is transformed into data indicating the user was at position (X, Y) when the optical image of the check was obtained.

In some instances, more than one location may be a potential location associated with the recorded time the optical image of the check was obtained, and therefore the approximate time of the check-based financial transaction. For instance, as a specific example, if the geographical position/location data is obtained from the user computing system every 10 minutes, then it is conceivable that more than one check-based financial transaction may have taken place between geographical position/location data points. For this reason, in some embodiments, the smaller the interval between obtained geographical position/location data, the more accurate the results.

In addition, as noted above, in one embodiment, the geographical position/location data is obtained/recorded "on demand", i.e., when one or more actions take place that trigger the gathering/recording of the geographical position/location data, and, in one embodiment, the geographical position/location data is obtained/recorded whenever the user obtains an optical image of a check, and/or activates an icon, and/or otherwise indicates the desire to record the geographical position/location data. In this way, the most accurate geographical position/location data for the check-based financial transaction is obtained.

Returning to FIG. 2, once the data indicating the approximate time of the financial transaction of DETERMINE AN APPROXIMATE TIME OF THE FINANCIAL TRANSACTION INVOLVING THE USER OPERATION 207 is analyzed along with the geographical position/location data from the user computing system of RECORD POSITION/LOCATION DATA AT THE TIME THE OPTICAL IMAGE OF THE CHECK IS OBTAINED OPERATION 207 to transform the data indicating the approximate time of the financial transaction into data indicating the user's approximate position/location at the approximate time of the financial transaction at USE THE POSITION/LOCATION DATA TO DETERMINE A MERCHANT PAYEE ASSOCIATED WITH THE CHECK-BASED FINANCIAL TRANSACTION OPERATION 213, the data indicating the user's approximate geographical position/location at the approximate time of the check-based financial transaction is used to search mapping and/or merchant location data in a mapping database to identify a most likely merchant payee associated with the check-based financial transaction.

In one embodiment, at USE THE POSITION/LOCATION DATA TO DETERMINE A MERCHANT PAYEE ASSOCIATED WITH THE CHECK-BASED FINANCIAL TRANSACTION OPERATION 213 the data indicating the user's approximate position/location at the recorded time the optical image of the check was obtained, and therefore the approximate time of the check-based financial transaction, is used to search mapping and/or merchant location data in a mapping database, such as mapping database 170 of FIG. 1, to identify a most likely merchant payee associated with the check-based financial transaction.

Returning to FIG. 2, in various embodiments, the mapping and/or merchant location data is obtained from a mapping database such as a mapping website, navigation system, communication network, or GPS system related database. Examples of mapping databases include, but are not limited to: map websites, such as Google Maps™, Yahoo Maps™, etc.; mobile positioning and/or navigation system websites/databases such as those associated with Garmin™ systems, Tom-Tom™ systems, etc.; and/or any other mapping website, navigation system, communication network, or GPS system related database, as discussed herein, and/or as known in the art at the time of filing, and/or as developed after the time of filing; and/or any other source of mapping data as discussed herein, and/or as known in the art at the time of filing, and/or as developed after the time of filing.

In one embodiment, the mapping and/or merchant location data, and/or the image-based financial transaction data, indicates a merchant, or merchants, associated with a given approximate location and this data is used to identify the most likely merchant payee. For instance, continuing with the example above, once it is determined that the user was at position (X, Y) when the check-based financial transaction took place, then the position (X, Y) can be used to search the mapping and/or merchant location data in the mapping database to determine that a "Merchant A" is at the location (X, Y) and therefore the identified most likely merchant payee is "Merchant A".

As noted above, in some instances, more than one location may be a potential location associated with the check-based financial transaction. For instance, as a specific example, if the geographical position/location data is obtained from the user computing system every 10 minutes, then it is conceivable that more than one potential merchant may be identified and the user may have to choose which merchant was involved, or some other mechanism for choosing the most likely merchant payee will have to be utilized. Once again, for this reason as well, in some embodiments, smaller intervals between obtained geographical position/location data, or the use of on-demand geographical position/location data, results in more accurate results.

In addition, in some embodiments, the image-based financial transaction data includes payee data and that data can be used to either identify, or confirm, the most likely merchant payee.

In one embodiment, once the data indicating the user's approximate geographical position/location at the approximate time of the check-based financial transaction is used to search mapping and/or merchant location data in a mapping database to identify a most likely merchant payee associated with the check-based financial transaction at USE THE POSITION/LOCATION DATA TO DETERMINE A MERCHANT PAYEE ASSOCIATED WITH THE CHECK-BASED FINANCIAL TRANSACTION OPERATION 213, process flow proceeds to OBTAIN MERCHANT DATA INDICATING THE TYPE OF PRODUCTS AND/OR SERVICES OFFERED BY THE IDENTIFIED MERCHANT PAYEE OPERATION 215.

In one embodiment, at OBTAIN MERCHANT DATA INDICATING THE TYPE OF PRODUCTS AND/OR SERVICES OFFERED BY THE IDENTIFIED MERCHANT PAYEE OPERATION 215 data indicating the products and/or services provided by the identified most likely merchant payee of USE THE POSITION/LOCATION DATA TO DETERMINE A MERCHANT PAYEE ASSOCIATED WITH THE CHECK-BASED FINANCIAL TRANSACTION OPERATION 213 is obtained from a merchant database.

In one embodiment, at OBTAIN MERCHANT DATA INDICATING THE TYPE OF PRODUCTS AND/OR SERVICES OFFERED BY THE IDENTIFIED MERCHANT PAYEE OPERATION 215 data indicating the products and/or services provided by the identified most likely merchant payee of USE THE POSITION/LOCATION DATA TO DETERMINE A MERCHANT PAYEE ASSOCIATED WITH THE CHECK-BASED FINANCIAL TRANSACTION OPERATION 213 is obtained from a merchant database, such as merchant database 176 of FIG. 1.

Returning to FIG. 2, in one embodiment, the merchant database of OBTAIN MERCHANT DATA INDICATING THE TYPE OF PRODUCTS AND/OR SERVICES OFFERED BY THE IDENTIFIED MERCHANT PAYEE OPERATION 215 and the mapping database of USE THE POSITION/LOCATION DATA TO DETERMINE A MERCHANT PAYEE ASSOCIATED WITH THE CHECK-BASED FINANCIAL TRANSACTION OPERATION 213 are the same database. For example, many mapping databases such as a mapping website, navigation system, communication network, or GPS system related databases include not only data indicating a merchant, or merchants, associated with a given approximate location, but also include data indicating products and/or services provided by the merchants at the identified locations.

In some embodiments, the merchant database and the mapping database are different databases and the data indicating the products and/or services provided by the identified most likely merchant payee is obtained from a separate merchant database such as, but not limited to, a website associated with the merchant, a merchant listing, a review website, or any other source of data indicating the products and/or services provided by the identified most likely merchant payee as discussed herein, and/or as known in the art at the time of filing, and/or as developed after the time of filing.

In one embodiment, once data indicating the products and/or services provided by the identified most likely merchant payee of USE THE POSITION/LOCATION DATA TO DETERMINE A MERCHANT PAYEE ASSOCIATED WITH THE CHECK-BASED FINANCIAL TRANSACTION OPERATION 213 is obtained from a merchant database at OBTAIN MERCHANT DATA INDICATING THE TYPE OF PRODUCTS AND/OR SERVICES OFFERED BY THE IDENTIFIED MERCHANT PAYEE OPERATION 215, process flow proceeds to USE THE MERCHANT DATA INDICATING THE TYPE OF PRODUCTS AND/OR SERVICES OFFERED BY THE IDENTIFIED MERCHANT PAYEE TO AUTOMATICALLY CATEGORIZE THE CHECK-BASED FINANCIAL TRANSACTION OPERATION 217.

In one embodiment, at USE THE MERCHANT DATA INDICATING THE TYPE OF PRODUCTS AND/OR SERVICES OFFERED BY THE IDENTIFIED MERCHANT PAYEE TO AUTOMATICALLY CATEGORIZE THE CHECK-BASED FINANCIAL TRANSACTION OPERATION 217 the data indicating the products and/or services provided by the identified most likely merchant payee of OBTAIN MERCHANT DATA INDICATING THE TYPE OF PRODUCTS AND/OR SERVICES OFFERED BY THE IDENTIFIED MERCHANT PAYEE OPERATION 215 is used, at least in part, to automatically assign a financial category to the check-based financial transaction and/or transform the category status of the check-based financial transaction of A USER WRITES A CHECK ASSOCIATED WITH A CHECK-BASED FINANCIAL TRANSACTION OPERATION 203.

In one embodiment, at USE THE MERCHANT DATA INDICATING THE TYPE OF PRODUCTS AND/OR SERVICES OFFERED BY THE IDENTIFIED MERCHANT PAYEE TO AUTOMATICALLY CATEGORIZE THE CHECK-BASED FINANCIAL TRANSACTION OPERATION 217 the data indicating the products and/or services provided by the identified most likely merchant payee of OBTAIN MERCHANT DATA INDICATING THE TYPE OF PRODUCTS AND/OR SERVICES OFFERED BY THE IDENTIFIED MERCHANT PAYEE OPERATION 215 is used, at least in part, to automatically assign a financial category to the check-based financial transaction and/or transform the category status of the check-based financial transaction of A USER WRITES A CHECK ASSOCIATED WITH A CHECK-BASED FINANCIAL TRANSACTION OPERATION 203 under the direction of one or more processors associated with one or more computing systems, such as CPU(s) 101 and/or 121 of FIG. 1.

Returning to FIG. 2, in embodiments where the image-based financial transaction data indicates the payee data associated with the check-based financial transaction, the data indicating the products and/or services provided by the identified most likely merchant payee is used, at least in part, to ensure that a financial category automatically assigned the check-based financial transaction based on the payee name data does indeed match the data indicating the products and/or services provided by the merchant payee. Then a financial category is assigned to the check-based financial transaction and/or the financial category status of the check-based financial transaction is transformed.

As a specific illustrative example, assume a user writes a check and obtains check image data at 11:03 on Jan. 3, 2012. Further assume geographic location data from a user mobile computing system indicates that the user was at location (X, Y) at 11:00 on Jan. 3, 2012. Further assume no payee data is available, or discernible, from the optical image of the check using OCR technology.

In this specific example, this location data and time data associated with the check-based financial transaction is transformed into data indicating the user was at position (X,Y) when the check-based financial transaction took place. Then, in this specific example, once it is determined that the user was at position (X, Y) when the check-based financial transaction took place, the position (X, Y) is used to search mapping and/or merchant location data in a mapping database, such as Google Maps™, to determine that merchant "The Auto Shop" is at the location (X, Y) and is therefore the identified most likely merchant payee.

In this specific example, data indicating the products and/or services provided by the "The Auto Shop" is obtained from a merchant database that, in this example, is also Google Maps™. In this specific example, it is found that "The Auto Shop" sells hamburgers and other fast food. Consequently, in this specific example, the check-based financial transaction is automatically categorized as a "dining/entertainment" expense.

As a similar specific illustrative example, assume a user writes a check and obtains check optical image data at 11:03 on Jan. 3, 2012. Assume location data from a user mobile computing system indicates that the user was at location (X, Y) at 11:00 on Jan. 3, 2012. Further assume that OCR analysis of the check optical image data shows the payee as "The Auto Shop". As noted above, using currently available automatic categorization systems, this check-based financial transaction would likely be automatically categorized as an "automobile" expense based on the payee name "The Auto Shop".

In this specific example, the location data and the time data associated with the financial transaction data is transformed into data indicating the user was at position (X,Y) when the check-based financial transaction took place. Then, in this specific example, once it is determined that the user was at position (X, Y) when the check-based financial transaction took place, the position (X, Y) is used to search mapping and/or merchant location data in a mapping database, such as Google Maps™, to determine that "The Auto Shop" is at the location (X, Y) and is therefore the identified most likely merchant payee.

In this specific example, data indicating the products and/or services provided by the "The Auto Shop" is obtained from a merchant database that, in this example, is also Google Maps™. In this specific example, it is found that "The Auto Shop" sells hamburgers and other fast food. Consequently, in this specific example, the check-based financial transaction is automatically categorized as a "dining/entertainment" expense as opposed to the first guess that the check-based financial transaction should be categorized as an automobile expense.

In one embodiment, once the data indicating the products and/or services provided by the identified most likely merchant payee of OBTAIN MERCHANT DATA INDICATING THE TYPE OF PRODUCTS AND/OR SERVICES OFFERED BY THE IDENTIFIED MERCHANT PAYEE OPERATION 215 is used, at least in part, to automatically assign a financial category to the check-based financial transaction and/or transform the category status of the check-based financial transaction of A USER WRITES A CHECK ASSOCIATED WITH A CHECK-BASED FINANCIAL TRANSACTION OPERATION 203 at USE THE MERCHANT DATA INDICATING THE TYPE OF PRODUCTS AND/OR SERVICES OFFERED BY THE IDENTIFIED MERCHANT PAYEE TO AUTOMATICALLY CATEGORIZE THE CHECK-BASED FINANCIAL TRANSACTION OPERATION 217, process flow proceeds to EXIT OPERATION 230. In one embodiment, at EXIT OPERATION 230 process for automatic categorization of check-based financial transactions 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for automatic categorization of check-based financial transactions 200, imaging and OCR technology, along with position/location technology, is combined with mapping databases, including mapping and/or merchant websites, and used to determine a likely merchant payee associated with a check-based financial transaction and the products sold by that merchant payee. This data is then used to determine a financial category to be automatically assigned to the check-based financial transaction. Consequently, using process for automatic categorization of check-based financial transactions 200, automatic categorization of check-based financial transactions is made possible and is more likely to be accurate. Therefore, using process for automatic categorization of check-based financial transactions 200, check-based transactions that must currently be manually entered and categorized can be automatically entered into a financial management system and accurately, and automatically, categorized.

In accordance with one embodiment, a system and method for automatic categorization of check-based financial transactions includes a process for automatic categorization of check-based financial transactions whereby an optical image of a check used to conduct a check-based financial transaction is obtained at the approximate time of the check-based financial transaction.

In one embodiment, voice data associated with the check-based financial transaction is obtained from a user and associated with the optical image data of the check used to conduct the check-based financial transaction.

In one embodiment, Optical Character Recognition (OCR) technology is used to extract image-based financial transaction data from the optical image of the check. In one embodiment, voice recognition technology is used to transform the voice data associated with the check-based financial transaction into voice-based financial transaction data.

In one embodiment, the image-based financial transaction data and the voice-based financial transaction data associated with the check-based financial transaction is used, at least in part, to automatically assign a financial category to the check-based financial transaction and/or transform the category status of the check-based financial transaction.

Figure 3:
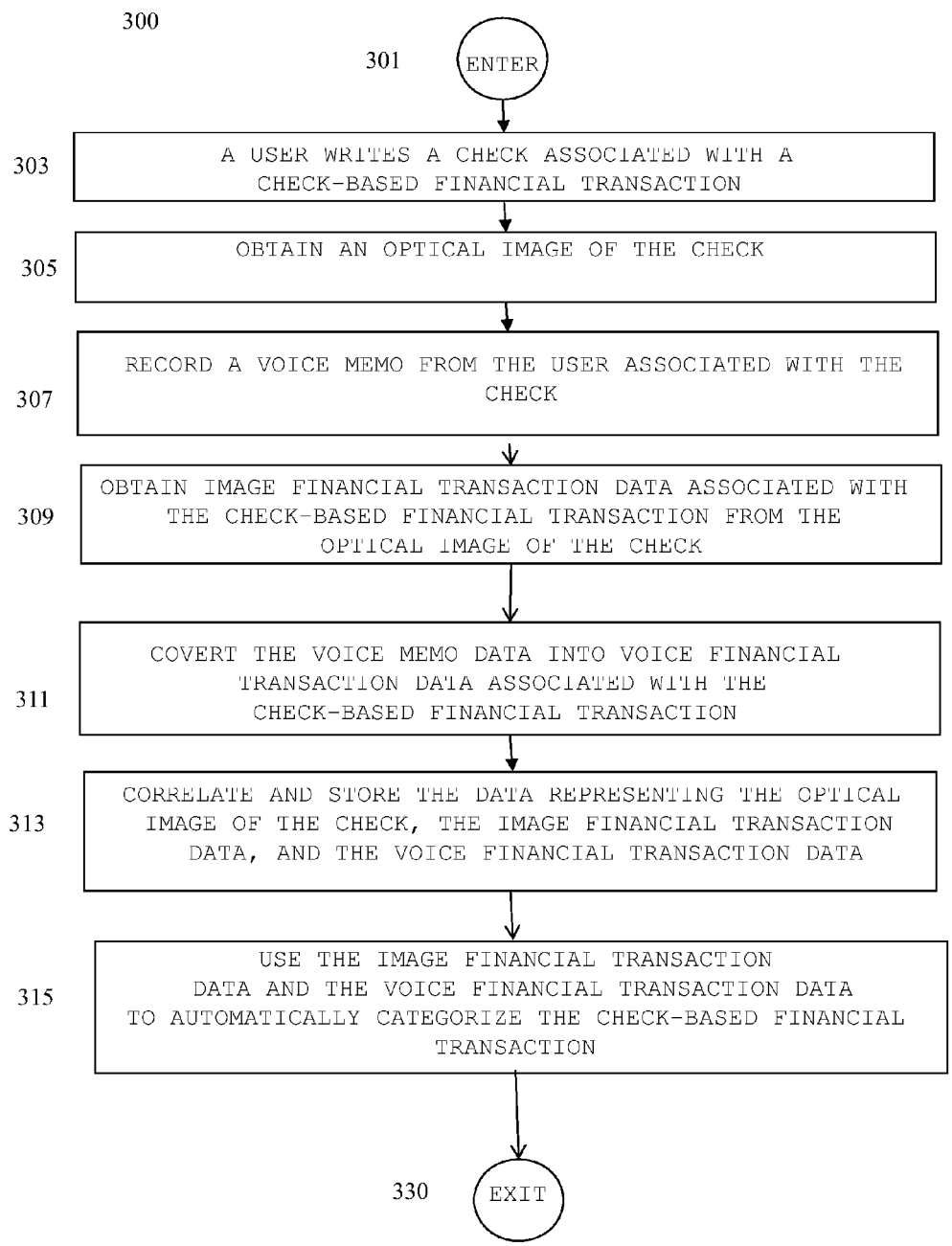
FIG. 3 is a flow chart depicting a process for automatic categorization of check-based financial transactions in accordance with one embodiment.

FIG. 3 is a flow chart depicting a process for automatic categorization of check-based financial transactions 300 in accordance with one embodiment. Process for automatic categorization of check-based financial transactions 300 begins at ENTER OPERATION 301 of FIG. 3 and process flow proceeds to A USER WRITES A CHECK ASSOCIATED WITH A CHECK-BASED FINANCIAL TRANSACTION OPERATION 303.

In one embodiment, at A USER WRITES A CHECK ASSOCIATED WITH A CHECK-BASED FINANCIAL TRANSACTION OPERATION 303 a user generates a paper check as part of a check-based financial transaction.

In various embodiments, the paper check is handwritten. In other embodiments, the paper check is printed, and/or otherwise, machine generated. In various embodiments, the paper check includes handwritten or printed check-based financial transaction data, such as payee, payment amount, date, bank account number, routing number, memo data, etc.

In one embodiment, once a user generates a paper check as part of a check-based financial transaction at A USER WRITES A CHECK ASSOCIATED WITH A CHECK-BASED FINANCIAL TRANSACTION OPERATION 303, process flow proceeds to OBTAIN AN OPTICAL IMAGE OF THE CHECK OPERATION 305.

In one embodiment, at OBTAIN AN OPTICAL IMAGE OF THE CHECK OPERATION 305 an optical image of the check used to conduct the check-based financial transaction of A USER WRITES A CHECK ASSOCIATED WITH A CHECK-BASED FINANCIAL TRANSACTION OPERATION 303 is obtained at the approximate time of the check-based financial transaction.

In one embodiment, at OBTAIN AN OPTICAL IMAGE OF THE CHECK OPERATION 305 at, or about, the time the paper check is generated, or tendered, at A USER WRITES A CHECK ASSOCIATED WITH A CHECK-BASED FINANCIAL TRANSACTION OPERATION 303 an optical image of the check is obtained. In one embodiment, the optical image of the check is obtained using a camera function included as part of a user computing system, such as user computing system 100 of FIG. 1. In one embodiment, the optical image of the check is obtained using a camera function included as part of a user mobile computing system, such as a mobile phone associated with the user.

Returning to FIG. 3, in one embodiment, at OBTAIN AN OPTICAL IMAGE OF THE CHECK OPERATION 305 the time the optical image of the check is obtained, and therefore the approximate time of the check-based financial transaction, is recorded. In one embodiment, at OBTAIN AN OPTICAL IMAGE OF THE CHECK OPERATION 305 the time the optical image of the check is obtained, and therefore the approximate time of the check-based financial transaction, is obtained by the user computing system, and/or user mobile computing system, such as user computing system 100 of FIG. 1, used to obtain the optical image of the check.

Returning to FIG. 3, in one embodiment, once an optical image of the check used to conduct the check-based financial transaction of A USER WRITES A CHECK ASSOCIATED WITH A CHECK-BASED FINANCIAL TRANSACTION OPERATION 303 is obtained at the approximate time of the check-based financial transaction at OBTAIN AN OPTICAL IMAGE OF THE CHECK OPERATION 305, process flow proceeds to RECORD A VOICE MEMO FROM THE USER ASSOCIATED WITH THE CHECK OPERATION 307.

In one embodiment, at RECORD A VOICE MEMO FROM THE USER ASSOCIATED WITH THE CHECK OPERATION 307 voice data associated with the check-based financial transaction of A USER WRITES A CHECK ASSOCIATED WITH A CHECK-BASED FINANCIAL TRANSACTION OPERATION 303 is obtained from a user and associated with the optical image data of the check used to conduct the check-based financial transaction of OBTAIN AN OPTICAL IMAGE OF THE CHECK OPERATION 305.

In one embodiment, at RECORD A VOICE MEMO FROM THE USER ASSOCIATED WITH THE CHECK OPERATION 307 voice data, such as voice data 188 of FIG. 1 is obtained from the user. In various embodiments, the voice data is provided by the user via a user computing system, such as user computing system 100 of FIG. 1. In some embodiments, the voice data is provided by the user via the same user computing system utilized to obtain the optical image of the check of OBTAIN AN OPTICAL IMAGE OF THE CHECK OPERATION 305 (FIG. 3).

In various embodiments, the voice data of RECORD A VOICE MEMO FROM THE USER ASSOCIATED WITH THE CHECK OPERATION 307 includes, but is not limited to, information indicating the check-based financial transaction for which the check is being written, the check number, a proposed categorization of the check-based financial transaction, the business associated with the check-based financial transaction, the location of the check-based financial transaction, and/or any other check-based financial transaction data such as, but not limited to, the payee, the amount, date, etc.

In one embodiment, once voice data associated with the check-based financial transaction of A USER WRITES A CHECK ASSOCIATED WITH A CHECK-BASED FINANCIAL TRANSACTION OPERATION 303 is obtained from a user and associated with the optical image data of the check used to conduct the check-based financial transaction of OBTAIN AN OPTICAL IMAGE OF THE CHECK OPERATION 305 at RECORD A VOICE MEMO FROM THE USER ASSOCIATED WITH THE CHECK OPERATION 307, process flow proceeds to OBTAIN IMAGE FINANCIAL TRANSACTION DATA ASSOCIATED WITH THE CHECK-BASED FINANCIAL TRANSACTION FROM THE OPTICAL IMAGE OF THE CHECK OPERATION 309.

In one embodiment, at OBTAIN IMAGE FINANCIAL TRANSACTION DATA ASSOCIATED WITH THE CHECK-BASED FINANCIAL TRANSACTION FROM THE OPTICAL IMAGE OF THE CHECK OPERATION 309 Optical Character Recognition (OCR) technology is used to extract image-based financial transaction data from the optical image of the check of OBTAIN AN OPTICAL IMAGE OF THE CHECK OPERATION 305.

In one embodiment, at OBTAIN IMAGE FINANCIAL TRANSACTION DATA ASSOCIATED WITH THE CHECK-BASED FINANCIAL TRANSACTION FROM THE OPTICAL IMAGE OF THE CHECK OPERATION 309 OCR technology, and/or pattern matching technology, is used to extract image-based financial transaction data, such as image financial transaction data 185 of FIG. 1 from the optical image of the check.

Returning to FIG. 3, in one embodiment, at OBTAIN IMAGE FINANCIAL TRANSACTION DATA ASSOCIATED WITH THE CHECK-BASED FINANCIAL TRANSACTION FROM THE OPTICAL IMAGE OF THE CHECK OPERATION 309 using OCR, and/or pattern matching technology, the handwritten, or printed, check-based financial transaction data, such as payee, payment amount, date, bank account number, routing number, memo data, etc. that is included in the obtained optical image of the check is transformed into electronic image-based financial transaction data, such as image financial transaction data 183 of FIG. 1, readable, and usable, by a financial management system, such as financial management system 180 of FIG. 1, in the same way electronic transaction data for electronic transactions is currently processed.

Herein, a financial management system can be, but is not limited to, any data management system implemented on a computing system and/or accessed through a network that gathers financial data, including financial transactional data, from one or more sources and/or has the capability to analyze and categorize at least part of the financial data, as discussed herein, and/or as known in the art at the time of filing, and/or as developed/made available after the time of filing.

In one embodiment, once OCR technology is used to extract image-based financial transaction data from the optical image of the check of OBTAIN AN OPTICAL IMAGE OF THE CHECK OPERATION 305 at OBTAIN IMAGE FINANCIAL TRANSACTION DATA ASSOCIATED WITH THE CHECK-BASED FINANCIAL TRANSACTION FROM THE OPTICAL IMAGE OF THE CHECK OPERATION 309, process flow proceeds to COVERT THE VOICE MEMO DATA INTO VOICE FINANCIAL TRANSACTION DATA ASSOCIATED WITH THE CHECK-BASED FINANCIAL TRANSACTION OPERATION 311.

In one embodiment, at COVERT THE VOICE MEMO DATA INTO VOICE FINANCIAL TRANSACTION DATA ASSOCIATED WITH THE CHECK-BASED FINANCIAL TRANSACTION OPERATION 311 voice recognition technology is used to transform the voice data associated with the check-based financial transaction of RECORD A VOICE MEMO FROM THE USER ASSOCIATED WITH THE CHECK OPERATION 307 into voice-based financial transaction data.

In one embodiment, at COVERT THE VOICE MEMO DATA INTO VOICE FINANCIAL TRANSACTION DATA ASSOCIATED WITH THE CHECK-BASED FINANCIAL TRANSACTION OPERATION 311 voice recognition technology is used to transform the voice data associated with the check-based financial transaction of RECORD A VOICE MEMO FROM THE USER ASSOCIATED WITH THE CHECK OPERATION 307 into voice-based financial transaction data, such as VM financial transaction data 189 of FIG. 1.

Returning to FIG. 3, in one embodiment, at COVERT THE VOICE MEMO DATA INTO VOICE FINANCIAL TRANSACTION DATA ASSOCIATED WITH THE CHECK-BASED FINANCIAL TRANSACTION OPERATION 311, the voice data is processed by a voice recognition system, such as voice recognition software, and/or one or more processors, such as CPU 101 and/or CPUs 121 of FIG. 1, to transform the voice data into voice-based financial transaction data readable, and usable, by a financial management system, such as financial management system 180 of FIG. 1, in the same way electronic transaction data for electronic transactions is currently processed.

Returning to FIG. 3, in one embodiment, once voice recognition technology is used to transform the voice data associated with the check-based financial transaction of RECORD A VOICE MEMO FROM THE USER ASSOCI- ATED WITH THE CHECK OPERATION 307 into voice-based financial transaction data at COVERT THE VOICE MEMO DATA INTO VOICE FINANCIAL TRANSACTION DATA ASSOCIATED WITH THE CHECK-BASED FINANCIAL TRANSACTION OPERATION 311, process flow proceeds to CORRELATE AND STORE THE DATA REPRESENTING THE OPTICAL IMAGE OF THE CHECK, THE IMAGE FINANCIAL TRANSACTION DATA, AND THE VOICE FINANCIAL TRANSACTION DATA OPERATION 313.

In one embodiment, at CORRELATE AND STORE THE DATA REPRESENTING THE OPTICAL IMAGE OF THE CHECK, THE IMAGE FINANCIAL TRANSACTION DATA, AND THE VOICE FINANCIAL TRANSACTION DATA OPERATION 313 the data representing the optical image of the check of OBTAIN AN OPTICAL IMAGE OF THE CHECK OPERATION 305, the voice-based financial transaction data of COVERT THE VOICE MEMO DATA INTO VOICE FINANCIAL TRANSACTION DATA ASSOCIATED WITH THE CHECK-BASED FINANCIAL TRANSACTION OPERATION 311, and/or the image-based financial transaction data of OBTAIN IMAGE FINANCIAL TRANSACTION DATA ASSOCIATED WITH THE CHECK-BASED FINANCIAL TRANSACTION FROM THE OPTICAL IMAGE OF THE CHECK OPERATION 309, is associated, correlated, and stored.

In one embodiment, at CORRELATE AND STORE THE DATA REPRESENTING THE OPTICAL IMAGE OF THE CHECK, THE IMAGE FINANCIAL TRANSACTION DATA, AND THE VOICE FINANCIAL TRANSACTION DATA OPERATION 313 the data representing the optical image of the check of OBTAIN AN OPTICAL IMAGE OF THE CHECK OPERATION 305, the voice-based financial transaction data of COVERT THE VOICE MEMO DATA INTO VOICE FINANCIAL TRANSACTION DATA ASSOCIATED WITH THE CHECK-BASED FINANCIAL TRANSACTION OPERATION 311, and/or the image-based financial transaction data of OBTAIN IMAGE FINANCIAL TRANSACTION DATA ASSOCIATED WITH THE CHECK-BASED FINANCIAL TRANSACTION FROM THE OPTICAL IMAGE OF THE CHECK OPERATION 309, is associated, correlated, and stored in a memory system such as memory systems 103 and/or 123 of FIG. 1, as check optical image data 183, VM financial transaction data 189, and image financial transaction data 185, respectively.

Returning to FIG. 3, in one embodiment, once the data representing the optical image of the check, the voice-based financial transaction data, and/or the image-based financial transaction data, is associated, correlated, and stored at CORRELATE AND STORE THE DATA REPRESENTING THE OPTICAL IMAGE OF THE CHECK, THE IMAGE FINANCIAL TRANSACTION DATA, AND THE VOICE FINANCIAL TRANSACTION DATA OPERATION 313, process flow proceeds to USE THE IMAGE FINANCIAL TRANSACTION DATA AND THE VOICE FINANCIAL TRANSACTION DATA TO AUTOMATICALLY CATEGORIZE THE CHECK-BASED FINANCIAL TRANSACTION OPERATION 315.

In one embodiment, at USE THE IMAGE FINANCIAL TRANSACTION DATA AND THE VOICE FINANCIAL TRANSACTION DATA TO AUTOMATICALLY CATEGORIZE THE CHECK-BASED FINANCIAL TRANSACTION OPERATION 315 the image-based financial transaction data and the voice-based financial transaction data associated with the check-based financial transaction of A USER WRITES A CHECK ASSOCIATED WITH A CHECK-BASED FINANCIAL TRANSACTION OPERATION 303 is used, at least in part, to automatically assign a financial category to the check-based financial transaction of A USER WRITES A CHECK ASSOCIATED WITH A CHECK-BASED FINANCIAL TRANSACTION OPERATION 303 and/or transform the category status of the check-based financial transaction of A USER WRITES A CHECK ASSOCIATED WITH A CHECK-BASED FINANCIAL TRANSACTION OPERATION 303.

In many cases, the voice-based financial transaction data will indicate the category to assign to the check-based financial transaction and will include the same type of data as the image-based financial transaction data, such payee data associated with the check-based financial transaction. In these cases, the redundancy of the data can be used as a built-in double-check mechanism to ensure that a financial category automatically assigned the check-based financial transaction based on the payee name data does indeed match the voice-based financial transaction data, and vice-versa.

In one embodiment, once the image-based financial transaction data and the voice-based financial transaction data associated with the check-based financial transaction of A USER WRITES A CHECK ASSOCIATED WITH A CHECK-BASED FINANCIAL TRANSACTION OPERATION 303 is used, at least in part, to automatically assign a financial category to the check-based financial transaction of A USER WRITES A CHECK ASSOCIATED WITH A CHECK-BASED FINANCIAL TRANSACTION OPERATION 303 and/or transform the category status of the check-based financial transaction of A USER WRITES A CHECK ASSOCIATED WITH A CHECK-BASED FINANCIAL TRANSACTION OPERATION 303 at USE THE IMAGE FINANCIAL TRANSACTION DATA AND THE VOICE FINANCIAL TRANSACTION DATA TO AUTOMATICALLY CATEGORIZE THE CHECK-BASED FINANCIAL TRANSACTION OPERATION 315, process flow proceeds to EXIT OPERATION 330.

In one embodiment, at EXIT OPERATION 330 process for automatic categorization of check-based financial transactions 300 is exited to await new data.

Using one embodiment of process for automatic categorization of check-based financial transactions 300, imaging and OCR technology along voice recognition technology, is used to determine a financial category to be automatically assigned to the check-based financial transaction. Consequently, using process for automatic categorization of check-based financial transactions 300, automatic categorization of check-based financial transactions is made possible and is more likely to be accurate. Therefore, using process for automatic categorization of check-based financial transactions 300, check-based transactions that must currently be manually entered and categorized can be automatically entered into a financial management system and accurately, and automatically, categorized.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for automatic categorization of check-based financial transactions comprising:
    using one or more processors to obtain optical image data of a check associated with a check-based financial transaction;
    using one or more processors to obtain voice data associated with the check-based financial transaction;
    using one or more processors to extract image financial transaction data associated with the check-based financial transaction from the optical image data of the check;
    using one or more processors to transform the voice data into voice memo financial transaction data associated with the check-based financial transaction;
    using one or more processors to generate check-based financial transaction categorization data based on analyzing the image financial transaction data and the voice memo financial transaction data associated with the check-based financial transaction; and
    using one or more processors to associate the check-based financial transaction categorization data with the check-based financial transaction and automatically transform data indicating the categorization of the check-based financial transaction.

2. The computing system implemented process for automatic categorization of check-based financial transactions of claim 1, wherein;
    the user computing system is a mobile computing system.

3. The computing system implemented process for automatic categorization of check-based financial transactions of claim 1, wherein;
    the optical image data of the check associated with the check-based financial transaction is obtained using a camera function associated with the user computing system.

4. The computing system implemented process for automatic categorization of check-based financial transactions of claim 1, wherein;
the voice data associated with the check-based financial transaction is obtained from the user via the user computing system.

5. A computing system implemented process for automatic categorization of check-based financial transactions comprising:
using one or more processors to obtain optical image data of a check associated with a check-based financial transaction;
using one or more processors to extract image financial transaction data associated with the check-based financial transaction from the optical image data of the check, the image financial transaction data including data indicating a date and time associated with the check-based financial transaction, the time of the transaction being at least partly based on a time that the optical image data was obtained;
using one or more processors to obtain voice data associated with the check-based financial transaction;
using one or more processors to obtain position/location data associated with a user computing system;
using one or more processors to analyze the position/location data associated with the user computing system and the data indicating the approximate time associated with the check-based financial transaction to transform the position/location data associated with the user computing system and the data indicating the approximate time associated with the check-based financial transaction into approximate check-based financial transaction location data indicating an approximate position/location of the user at the time of the check-based financial transaction;
using one or more processors to search merchant location data using the approximate check-based financial transaction location data to identify a merchant payee associated with the check-based financial transaction and transform the approximate check-based financial transaction location data into likely merchant payee data;
using one or more processors to search merchant data indicating the products and/or services provided by one or more merchants using the likely merchant payee data to identify the products and/or services provided by the identified likely merchant payee and transform the likely merchant payee data into check-based financial transaction products and/or services data indicating the products and/or services associated with the check-based financial transaction;
using one or more processors to transform the voice data into voice memo financial transaction data associated with the check-based financial transaction;
using one or more processors to analyze the check-based financial transaction products and/or services data and the voice memo financial transaction data associated with the check-based financial transaction and transform at least part of the check-based financial transaction products and/or services data and at least part of voice memo financial transaction data associated with the check-based financial transaction into check-based financial transaction categorization data; and
using one or more processors to associate the check-based financial transaction categorization data with the check-based financial transaction and automatically transform data indicating the categorization of the check-based financial transaction.

6. A system for automatic categorization of check-based financial transactions comprising:
a user computing system, the user computing system being associated with a user and capable of receiving voice data;
a voice recognition system capable of transforming voice data into voice memo financial transaction data; and
one or more processors associated with one or more computing systems, the one or more processors associated with one or more computing systems implementing at least part of a process for automatic categorization of check-based financial transactions, the process for automatic categorization of check-based financial transactions including:
using the one or more processors associated with one or more computing systems to obtain optical image data of a check associated with a check-based financial transaction;
using the one or more processors associated with one or more computing systems to obtain voice data associated with the check-based financial transaction;
using the one or more processors associated with one or more computing systems to extract image financial transaction data associated with the check-based financial transaction from the optical image data of the check;
using the one or more processors associated with one or more computing systems to direct the voice recognition system to transform the voice data into voice memo financial transaction data associated with the check-based financial transaction;
using the one or more processors associated with one or more computing systems to generate check-based financial transaction categorization data based on analyzing the image financial transaction data and the voice memo financial transaction data associated with the check-based financial transaction; and
using the one or more processors associated with one or more computing systems to associate the check-based financial transaction categorization data with the check-based financial transaction and automatically transform data indicating the categorization of the check-based financial transaction.

7. The system for automatic categorization of check-based financial transactions of claim 6, wherein;
the user computing system is a mobile computing system.

8. The system for automatic categorization of check-based financial transactions of claim 6, wherein;
the optical image data of the check associated with the check-based financial transaction is obtained using a camera function associated with the user computing system.

9. The system for automatic categorization of check-based financial transactions of claim 6, wherein;
the voice data associated with the check-based financial transaction is obtained from the user via the user computing system.

10. A system for automatic categorization of check-based financial transactions comprising:
a user computing system, the user computing system being associated with a user and capable of providing position/location data associated with the user computing system, the user computing system being capable of receiving voice data;
a voice recognition system capable of transforming voice data into voice memo financial transaction data;

a mapping database, the mapping database associating position/location data with merchants located at the position indicated by the position/location data;

a merchant database, the merchant database including data indicating the products and/or services provided by one or more merchants; and one or more processors associated with one or more computing systems, the one or more processors associated with one or more computing systems implementing at least part of a process for automatic categorization of check-based financial transactions, the process for automatic categorization of check-based financial transactions including:

using the one or more processors associated with one or more computing systems to obtain optical image data of a check associated with a check-based financial transaction;

using the one or more processors associated with one or more computing systems to extract image financial transaction data associated with the check-based financial transaction from the optical image data of the check, the image financial transaction data including data indicating a date and time associated with the check-based financial transaction, the time of the transaction being at least partly based on a time that the optical image data was obtained;

using the one or more processors associated with one or more computing systems to obtain voice data associated with the check-based financial transaction;

using the one or more processors associated with one or more computing systems to obtain position/location data associated with a user computing system;

using the one or more processors associated with one or more computing systems to analyze the position/location data associated with the user computing system and the data indicating the approximate time associated with the check-based financial transaction to transform the position/location data associated with the user computing system and the data indicating the approximate time associated with the check-based financial transaction into approximate check-based financial transaction location data indicating an approximate position/location of the user at the time of the check-based financial transaction;

using the one or more processors associated with one or more computing systems to search merchant location data in the mapping database using the approximate check-based financial transaction location data to identify a merchant payee associated with the check-based financial transaction and transform the approximate check-based financial transaction location data into likely merchant payee data;

using the one or more processors associated with one or more computing systems to search merchant data in the merchant database indicating the products and/or services provided by one or more merchants using the likely merchant payee data to identify the products and/or services provided by the identified likely merchant payee and transform the likely merchant payee data into check-based financial transaction products and/or services data indicating the products and/or services associated with the check-based financial transaction;

using the one or more processors associated with one or more computing systems to transform the voice data into voice memo financial transaction data associated with the check-based financial transaction;

using the one or more processors associated with one or more computing systems to analyze the check-based financial transaction products and/or services data and the voice memo financial transaction data associated with the check-based financial transaction and transform at least part of the check-based financial transaction products and/or services data and at least part of voice memo financial transaction data associated with the check-based financial transaction into check-based financial transaction categorization data; and using the one or more processors associated with one or more computing systems to associate the check-based financial transaction categorization data with the check-based financial transaction and automatically transform data indicating the categorization of the check-based financial transaction.

11. The system for automatic categorization of check-based financial transactions of claim 10, wherein;
the user computing system is a mobile computing system.

12. The system for automatic categorization of check-based financial transactions of claim 10, wherein;
the optical image data of the check associated with the check-based financial transaction is obtained using a camera function associated with the user computing system.

13. The system for automatic categorization of check-based financial transactions of claim 10, wherein;
the position/location data associated with the user computing system is obtained on a periodic basis.

14. The system for automatic categorization of check-based financial transactions of claim 10, wherein;
the position/location data associated with the user computing system is obtained automatically when the optical image data of the check associated with the check-based financial transaction is obtained.

15. The system for automatic categorization of check-based financial transactions of claim 10, wherein;
the position/location data associated with the user computing system is obtained on an on-demand basis in response to a user action.

16. The system for automatic categorization of check-based financial transactions of claim 10, wherein;
the merchant database and mapping database are the same database.

17. The system for automatic categorization of check-based financial transactions of claim 10, wherein;
the voice data associated with the check-based financial transaction is obtained from the user via the user computing system.

* * * * *